(12) United States Patent
Franz et al.

(10) Patent No.: US 8,239,836 B1
(45) Date of Patent: Aug. 7, 2012

(54) MULTI-VARIANT PARALLEL PROGRAM EXECUTION TO DETECT MALICIOUS CODE INJECTION

(75) Inventors: Michael Franz, Irvine, CA (US); Andreas Gal, Irvine, CA (US); Babak Salamat, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 1163 days.

(21) Appl. No.: 12/075,127

(22) Filed: Mar. 7, 2008

(51) Int. Cl.
*G06F 9/44* (2006.01)

(52) U.S. Cl. ...................................................... 717/127

(58) Field of Classification Search .................... 714/20, 714/25, 38; 711/132
See application file for complete search history.

(56) References Cited

U.S. PATENT DOCUMENTS

| | | | | |
|---|---|---|---|---|
| 5,583,988 | A * | 12/1996 | Crank et al. | 714/48 |
| 5,590,329 | A * | 12/1996 | Goodnow et al. | 717/144 |
| 6,766,513 | B2 * | 7/2004 | Charnell et al. | 717/154 |
| 6,795,910 | B1 * | 9/2004 | Tormey et al. | 712/202 |
| 6,941,473 | B2 * | 9/2005 | Etoh et al. | 726/5 |
| 6,996,677 | B2 * | 2/2006 | Lee et al. | 711/132 |
| 7,272,748 | B1 * | 9/2007 | Conover et al. | 714/20 |
| 7,380,245 | B1 * | 5/2008 | Lovette | 718/100 |
| 7,581,089 | B1 | 8/2009 | White | |
| 7,613,954 | B2 | 11/2009 | Grey et al. | |
| 7,802,232 | B2 | 9/2010 | Zorn et al. | |
| 8,024,798 | B2 * | 9/2011 | Moritzen | 726/22 |
| 8,037,526 | B1 * | 10/2011 | Satish et al. | 726/22 |
| 2002/0116662 | A1 * | 8/2002 | Hofstee et al. | 714/25 |
| 2003/0065929 | A1 * | 4/2003 | Milliken | 713/189 |
| 2003/0145253 | A1 | 7/2003 | de Bonet | |
| 2007/0089088 | A1 * | 4/2007 | Borde et al. | 717/106 |
| 2007/0136565 | A1 | 6/2007 | Lambrache et al. | |
| 2007/0174687 | A1 * | 7/2007 | Graham et al. | 714/13 |
| 2007/0234296 | A1 | 10/2007 | Zorn et al. | |
| 2007/0250820 | A1 * | 10/2007 | Edwards et al. | 717/131 |
| 2008/0133866 | A1 | 6/2008 | Dickenson et al. | |
| 2008/0271142 | A1 * | 10/2008 | Murawski et al. | 726/22 |

FOREIGN PATENT DOCUMENTS

| EP | 1168178 A2 * | 1/2002 |
|---|---|---|
| EP | 1693775 A1 * | 8/2006 |

OTHER PUBLICATIONS

Salamat et al., "Stopping Buffer Overflow Attacks at Run-Time: Simultaneous Multi-Variant Program Execution on a Multicore Processor", Technical Report No. 07-13, Dec. 4, 2007.*

Berger et al., "DieHard: Probabilistic Memory Safety for Unsafe Languages", University of Massachusetts Amherst Computer Science Technical Report 05-65 2005 ACM.*

Cowan et al., "StackGuard: Automatic Adaptive Detection and Prevention of Buffer-Overflow Attacks", Proceedings of the 7th USENIX Security Symposium San Antonio, Texas, Jan. 26-29, 1998.*

Avižienis, "The Methodology of N-Version Programming", Software Fault Tolerance, Edited by Lyu 1995 John Wiley & Sons Ltd.*

(Continued)

*Primary Examiner* — Don Wong
*Assistant Examiner* — Daxin Wu
(74) *Attorney, Agent, or Firm* — Fish & Richardson P.C.

(57) ABSTRACT

Techniques, computer program products, apparatus and systems for controlling operation of a program code in a digital processor, a computer or a computer system, including techniques for generating program variants, monitoring execution of a program and variants of the program, and detecting functional differences between the multiple executions.

54 Claims, 14 Drawing Sheets

OTHER PUBLICATIONS

Cox et al., "N-Variant Systems a Secretless Framework for Security through Diversity", 15th USENIX Security Symposium, Vancouver, BC, Aug. 2006.*

Transparent Run-Time Defense Against Stack Smashing Attacks, Baratloo et al., Proceedings of 2000 USENIX Annual Technical Conference, Jun. 18-23, 2000.*

Protecting from stack-smashing attacks, Etoh et al., IBM Research Division, Tokyo Research Laboratory, Jun. 19, 2000.*

Avizienis, A. and Chen, L. "On the implementation of n-version programming for software fault tolerance during execution." In IEEE COMPSAC 77, Sheraton-O'hare Motor Hotel, Chicago O'hare Airport, Illinois, USA, pp. 149-155.

Berger, E. D. and Zorn, B. G. "Diehard: probabilistic memory safety for unsafe languages." PLDI '06, Jun. 11-14, 2006, Ottawa, Ontario, Canada, pp. 158-168.

Bhatkar, S., et al, "Address obfuscation: An efficient approach to combat a broad range of memory error exploits." $12^{th}$ USENIX Security Symposium, Washington, D.C., USA, pp. 105-120, 2003.

Chew, M. and Song, D. "Mitigating Buffer Overflows by Operating System Randomization." Technical Report CMU-CS-02-197, Department of Computer Science, Carnegie Mellon University, Dec. 2002. [Available on the Internet: <URL:http://citeseer.ist.psu.edu/chew02mitigating.html>.

Cohen, F., "Operating system protection through program evolution." *Computers and Security, 12(6): 565-584*, Oct. 1993. [Retrieved from the Internet on Jun. 2, 2008], <URL:http://www.all.net/books/IP/evolve.html>.

Corliss, M. L., et al., "Using DISE to protect return addresses from attack." *SIGARCH Computer Architecture News*, Published by ACM, New York, NY, USA, 33(1):65-72, 2005.

Cowan, C., et al., "Pointguard: Protecting pointers from buffer overflow vulnerabilities." $12^{th}$ USENIX Security Symposium, Washington, D.C., USA, pp. 91-104, Aug. 4-8, 2003.

Cowan, C., et al., "Stackguard: Automatic adaptive detection and prevention of buffer-overflow attacks." $7^{th}$ USENIX Security Symposium, San Antonio, Texas, Jan. 26-29, 1998, pp. 63-78.

Cox, B., et al., "N-variant systems: A secret less framework for security through diversity." $15^{th}$ USENIX Security Symposium, Vancouver, British Colombia, Canada, pp. 105-120, 2006.

Forrest, S., et al., "Building diverse computers systems." In HotOS-VI, May 5-6, 1997, Wequassett Inn, Cape Cod, Massachusetts, pp. 67-72.

Frantzen, M. and Shuey, M., "Stackghost: Hardware facilitated stack protection." $10^{th}$ USENIX Security Symposium, Aug. 13-17, 2001, Washington, D.C., USA, pp. 55-66.

Franz, M., "Understanding and Countering Insider Threats in Software Development" University of California Irvine, *mcetech*, pp. 81-90, 2008 International MCETECH Conference on e-Technologies (mcetech 2008), Montreal, Canada, Jan. 23-25, 2008.

Joseph, M. K. and Avizienis, A. "A fault tolerance approach to computer viruses." 1988 IEEE Symposium on Security and Privacy, Apr. 18-21, 1988, Oakland, California, pp. 52-58.

Lvin, V. B., et al. "Archipelago: Trading address space for reliability and security." ASPLOS XIII, Seattle, Washington, USA. Mar. 1-5, 2008 (10 pages).

McGregor, J., et al. "A processor architecture defense against buffer overflow attacks." *ITRE '03*, Aug. 11-13, Newark, NJ, USA, pp. 243-250.

Salamat, B., et al., "Stopping Buffer Overruns at Run-Time: Simultaneous Multi-Variant Program Execution on a Multicore Processor" Donald Bren School of Information and Computer Sciences, University of California Irvine, Technical Report No. 07-13, Dec. 4, 2007. [online accessed May 15, 2008] Available on the Internet at <URL:http://www.ics.uci.edu/-bsalamat/files/TechReport-07-13.pdf>.

Tuck, N., et al. "Hardware and binary modification support for code pointer protection from buffer overflow." MICRO 37, Dec. 4-8, 2004, Doubletree Hotel, Portland, Oregon, pp. 209-220.

Xu, J., et al. "Transparent runtime randomization for security." In SRDS'03, Oct. 6-8, 2003, Florence, Italy, pp. 260-269.

* cited by examiner

MULTI-VARIANT PARALLEL PROGRAM EXECUTION TO DETECT MALICIOUS CODE INJECTION

STATEMENT AS TO FEDERALLY SPONSORED RESEARCH

The research for various technical features in the systems and techniques described in this application received funding from the United States Intelligence Advanced Research Projects Agency (IARPA) and Air Force Research Laboratory (AFRL) under agreement FA8750-07-2-0085. The U.S. Government may have certain rights to various technical features described in this application.

BACKGROUND

This application relates to digital processing, digital processors, computers and computer systems.

Computer systems, such as those for e-commerce and e-government, depend on trustworthy software platforms. However, such software platforms and computer systems can contain vulnerabilities that can compromise their trustworthiness. Data elements of these applications, such as buffers, can be exploited. For example, a vulnerable buffer can give a remote attacker access to a computer system. An exploit can include a write to an array data structure that has no proper bounds check. Writing beyond the end of a buffer can overwrite sensitive data such as a return address. A program having this type of vulnerability will work as intended for as long as the size of the buffer is not exceeded. However, an attacker who is aware of the lack of the range check can overflow the buffer whenever he or she chooses. Overwriting the return address can lead to the program unwittingly executing code from an attacker.

SUMMARY

This application describes implementations and examples of techniques, computer program products, apparatus and systems for controlling operation of a program code in a digital processor, a computer or a computer system, including techniques for generating program variants, monitoring execution of a program and variants of the program, and detecting functional differences between the multiple executions. In one aspect, a method for controlling operation of a program code can include obtaining a first program code; generating a second program code from the first program code by altering a first characteristic of the first program code, wherein the first program code and the second program code are semantically equivalent; executing the first program code; executing the second program code; and monitoring for a functional difference between the execution of the first program code and the execution of the second program code to detect abnormal behavior.

The techniques also can be implemented to include monitoring for a divergence of control flow between the execution of the first program code and the execution of the second program code. The techniques also can be implemented to include distributing input data to the execution of the first program code and the execution of the second program code, wherein monitoring for the functional difference comprises monitoring for the functional difference between the execution of the first program code and the execution of the second program code in response to the input data. The first characteristic can include a direction of stack growth. The techniques also can be implemented to selecting the first characteristic from a plurality of characteristics, wherein the plurality of characteristics comprises a direction of stack growth, padding between call stack members, register allocation, and heap allocation.

Executing the first program code can occur in lockstep with executing the second program code. The monitoring for the functional difference can include comparing a first instruction from the execution of the first program code to a corresponding second instruction from the execution of the second program code. The functional difference can occur if the first instruction differs in instruction type from the second instruction.

The techniques also can be implemented to include executing the monitoring for the functional difference when either the execution of the first program code or the second program code reaches a control transfer instruction. The techniques also can be implemented to include executing the monitoring for the functional difference when either the execution of the first program code or the second program code reaches a system call. The techniques also can be implemented to include detecting the functional difference; and suspending the execution of the first program code and the execution of the second program code after detecting the functional difference.

The techniques also can be implemented to include generating a third program code by altering a second characteristic of the first program code, wherein the first program code and the third program code are semantically equivalent; executing the third program code, wherein monitoring for the functional difference comprises monitoring for the functional difference between the execution of the first program code, the execution of the second program code, and the execution of the third program code.

Generating the second program code from the first program code can include using a source code representation of the first program code to generate the second program code. Generating the second program code from the first program code can include using an object code representation of the first program code to generate the second program code.

The techniques also can be implemented to include executing the monitoring for the functional difference at user-level. Executing the first program code can include advancing the execution of the first program code to a first system call, wherein executing the second program code includes advancing the execution of the second program code to a second system call, wherein monitoring for the functional difference includes determining if the first system call is equivalent to the second system call. The techniques also can be implemented to include detecting the abnormal behavior when the second system call occurs more than a period of time after the occurrence of the first system call. The techniques also can be implemented to include comprising allowing an execution of the first system call based on whether the first system call is equivalent to the second system call. The monitoring for the functional difference occurs between a transfer of control flow between an operating system and the execution of the either the first or second program code execution.

The techniques also can be implemented to include executing the first program code on a first instance of an operating system and executing the second program code includes executing the second program code on a second instance of the operating system. The techniques also can be implemented to include comparing a first behavior of the first instance of the operating system to a second behavior of the second instance of the operating system. The techniques also can be implemented to include a first processor to execute the first program code and the second program code. The techniques also can be implemented to include comprising operating a first processor to execute the first program code and a second processor to execute the second program code.

In another aspect, a method for controlling operation of a program code can include obtaining a first program code that effects a first call stack to grow in a first direction; generating a second program code from the first program code that effects a second call stack to grow in a second direction that differs from the first direction, wherein the first program code and the second program code are semantically equivalent; executing the first program code to produce a first executed instruction comprising a first instruction type; executing the second program code in lockstep with the execution of the first program code to produce a second executed instruction comprising a second instruction type; and comparing the first instruction type to the second instruction type to detect abnormal behavior.

The techniques also can be implemented to include suspending execution of the first program code and execution of the second program code when the abnormal behavior is detected. The second call stack can comprises padding between a first member of the second call stack and a second member of the second call stack. The techniques also can be implemented to include operating a first processor to execute the first program code and the second program code. The techniques also can be implemented to include operating a first processor to execute the first program code and a second processor to execute the second program code. Generating the second program code from the first program code can include using a source code representation of the first program code to generate the second program code. Generating the second program code from the first program code can include using an object code representation of the first program code to generate the second program code.

In another aspect, a method for controlling operation of a program code can include executing a first program code with a first call stack associated with the execution of the first program code that expands in a first direction; executing a second program code with a second call stack associated with the execution of the second program that expands in a second direction, wherein the second program differs from the first program code to effect the second direction to be opposite from the first direction; and monitoring for a functional difference between the execution of the first program code and the execution of the second program code to detect abnormal behavior.

The techniques also can be implemented to include executing the monitoring for the functional difference at user-level when either the execution of the first program code or the second program code reaches a system call. The second call stack can include padding between a first member of the second call stack and a second member of the second call stack. The techniques also can be implemented to include operating a first processor to execute the first program code and the second program code. The techniques also can be implemented to include operating a first processor to execute the first program code and a second processor to execute the second program code.

In one aspect, a system for controlling operation of a program code can include a first processor core that executes a first program code to produce a first instruction; a second processor core that executes a second program code to produce a second instruction, wherein the second program code differs from the first program code by a characteristic, wherein the first program code and the second program code are semantically equivalent, wherein the second processor core executes in lockstep with the first processor core; and a monitor unit that compares the first instruction to the second instruction to determine whether the first instruction differs in instruction type from the second instruction to detect an abnormal behavior.

The system also can be implemented to have the first and second processor cores responsive to the monitor unit. The first processor core can suspend execution of the first program code when the abnormal behavior is detected.

In one aspect, a method for controlling operation of a program code in a computer system can include obtaining a program code, generating a plurality of variants from the program, wherein each variant of the plurality of variants differs from other variants of the plurality of variants, wherein each variant of the plurality of variants is semantically equivalent to the program code, executing each variant of the plurality of variants, monitoring for a divergence of control flow between the variant executions to detect an abnormal execution; and determining the abnormal execution within the execution of the variants by majority voting, wherein the abnormal execution differs in control flow from a majority of the variant executions.

The techniques also can be implemented to include suspending the abnormal execution after the abnormal execution is detected; and continuing to execute the majority of the variant executions after the abnormal execution is detected. The techniques also can be implemented to include generating the plurality of variants from the program code can use either a source code representation of the program code or an object code representation of the program code. A variant of the plurality of variants can be the program code. Executing each variant of the plurality of variants can include executing a chuck of each variant of the plurality of variants, and the techniques also can be further implemented to include committing an instruction that comes from the majority of the variant executions; and canceling an instruction that comes from the abnormal execution.

In one aspect, a computer system for controlling operation of a program code can include a code variance generator that generates a plurality of variants from a program, wherein each variant of the plurality of variants differs from other variants of the plurality of variants, wherein each variant of the plurality of variants is semantically equivalent to the program code, a processing module that executes each variant of the plurality of variants, and a monitor unit that monitors for a functional difference between the variant executions to detect an abnormal execution, wherein the processing module is responsive to the monitor unit.

The system also can be implemented to have the processing module include a first processor to execute a first variant and second variant from the plurality of variants. The system also can be implemented to have the processing module include a first processor to execute a first variant from the plurality of variants and a second processor to execute a second variant from the plurality of variants. Generating the plurality of variants from the program code can include using a source code representation of the program. Generating the plurality of variants from the program code can include using a object code representation of the program. The monitor unit can monitor for the functional difference when an execution of a variant of the plurality of variants reaches a system call. The processing module can suspend execution of each variant of the plurality of variants when the functional difference occurs. The monitor unit can monitor for a divergence of control flow between the variant executions to detect an abnormal execution and determines the abnormal execution within the execution of the variants by majority voting, wherein the abnormal execution differs in control flow from a majority of the variant executions. The processing module can suspend the abnormal execution after the abnormal execution is detected and can continue to execute the majority of the variant executions after the abnormal execution is detected. The processing module can commit an instruction that comes from the majority of the variant executions and can cancel an instruction that comes from the abnormal execution.

In another aspect, the techniques can be implemented as a computer program product, encoded on a computer-readable medium, operable to cause data processing apparatus to perform operations including: generating a plurality of variants from a program code, wherein each variant of the plurality of variants differs from other variants of the plurality of variants, wherein each variant of the plurality of variants is semantically equivalent to the program code; executing each variant of the plurality of variants; monitoring for a divergence of control flow between the variant executions to detect an abnormal execution; and determining the abnormal execution within the execution of the variants by majority voting, wherein the abnormal execution differs in control flow from a majority of the variant executions.

The techniques also can be implemented to be further operable to cause data processing apparatus to perform operations including suspending the abnormal execution after the abnormal execution is detected; and continuing to execute the majority of the variant executions after the abnormal execution is detected. Generating the plurality of variants from the program code can include using either a source code representation of the program code or an object code representation of the program code. A variant of the plurality of variants can be the program code. Each variant of the plurality of variants can differ from other variants of the plurality of variants by one or more characteristics selected from a group including a direction of stack growth, padding between call stack members, register allocation, and heap allocation. The techniques also can be implemented to be further operable to cause data processing apparatus to perform operations including executing the monitoring for the functional difference at user-level. The techniques also can be implemented to be further operable to cause data processing apparatus to perform operations including executing the monitoring for the functional difference when execution of a variant of the plurality of variants reaches a system call.

The systems, techniques, and computer program products described here can provide one or more of the following advantages. For example, the systems, techniques, and computer program products can be implemented such that a functional difference between the program code variants can be detected. Such a functional difference can indicate a buffer overflow attack or other exploit of program code by an attacker. The systems, techniques, and computer program products can be implemented such that a recovery from an attempted exploitation can be possible.

The details of one or more embodiments of the systems, techniques, and computer program products are set forth in the accompanying drawings and the description below. Other features, objects, and advantages of the systems, techniques, and computer program products will be apparent from the description and drawings, and from the claims.

DESCRIPTION OF DRAWINGS

Like reference symbols in the various drawings indicate like elements.

DETAILED DESCRIPTION

Figure 1A:
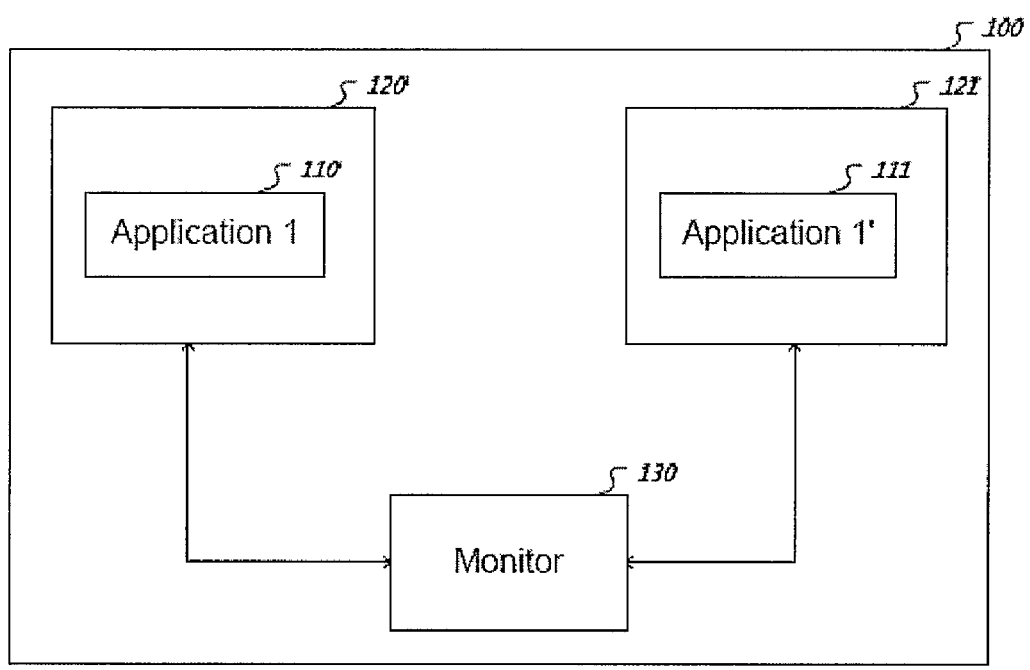
FIG. 1A shows an example of a multi-core execution environment.

A computer system executing software products, such as a program code, can contain buffer-overflow vulnerabilities. Buffer-overflow and related vulnerabilities can allow an attacker to execute arbitrary code on a computer. These vulnerabilities can be exploited through external input sources to the software product such as user input, data received via a network connection, or a computer file.

A frequent exploit of a buffer-overflow vulnerability can cause a write to an array data structure that has no proper bounds check. Writing beyond the end of the buffer can overwrite sensitive data such as a return address. A program having this type of vulnerability can work as intended for as long as the size of the buffer is not exceeded. However, an attacker who is aware of the lack of the bounds check can overflow the buffer. A bounds check can include checking a size of a buffer before writing to the buffer.

The vulnerable program can be expected to work as expected on input sources that are within the program's specification. An input source that exploits the program's vulnerability can be related to an unspecified and/or out-of-specification behavior of the vulnerable program. An unspecified behavior can be a behavior that is not intended to result from the program's execution. Although the behavior of the vulnerable program can be unspecified when the vulnerability is exploited, an attacker relies on knowing exactly what actual behavior results in such an unspecified condition. In order to exploit a buffer-overflow vulnerability, an attacker needs to know one or more locations on a program's execution stack to overwrite and the values to be written to these locations. By generating semantically equivalent variants of a program and running the variants in parallel, an attacker would first need to know locations on multiple stacks and the data to be placed in those locations. Then the attacker would have to have the same attack code effect changes in multiple locations without being detected which can be nearly difficult or impossible with the systems and techniques presented herein. An exploitation of an application can lead to functional differences between an application susceptible to the vulnerability and a variant of the application that is not susceptible to the vulnerability.

One or more different variants of the same program can be generated. These program variants can have identical in-specification behavior, but differ in their out-of-specification behavior. These different variants can react in different ways from each other when a buffer overflow occurs. These different variants of the same program can be executed in lockstep. In some implementations, the different variants can be executed on different cores of a multi-core microprocessor. The different program variants that are executing in lockstep can be monitored for abnormal behavior such as a discrepancy. Any discrepancies in behavior between the simultaneously executing variants indicate that an out-of-specification condition has occurred and can be a sign of an attack.

Detecting an attack can include generating variant program codes from a given application by altering a characteristic of that application. These variants can be semantically equivalent. These variants can be executed within a computer system and monitored for a functional difference between the execution of the variants to detect abnormal behavior. The computer system can include a host with a processor and/or a host with multiple processors, such as multiple cores on a computer chip or multiple processor chips within a host. In some implementations, the computer system can include a computer network of hosts with either single or multiple processors.

FIG. 1A shows an example of a multi-core execution environment running different variants of a program. Program variants 110, 111 can have identical functional behavior for input sources that are within the program's specification, but can have different functional behavior for input sources that are outside of the program's specification or intended behavior. Program variants 110, 111 can behave in different ways when a buffer-overflow occurs. To detect divergence between the execution of program variants 110, 111, a processing environment 100 can be configured to run program variants 110, 111 on processor cores 120, 121. In some implementations, processor cores 120, 121 can be apart of a multi-core microprocessor. Execution of program variants 110, 111 on processor cores 120, 121 can be in lockstep. Lockstep execution can include running multiple program codes instruction by instruction such that a processor advances no more than one instruction over the other processors at any given time.

A monitor unit 130 can be configured to detect a functional difference between program variants 110, 111 during their execution. The implementation of the monitoring unit 130 can be in hardware, software, or a combination thereof. A functional difference can be a discrepancy in behavior between simultaneously executing program variants; such a difference can indicate that an out-of-specification condition has occurred. For example, the monitor unit 130 can monitor the executed instructions from processor cores 120, 121. If the executed instructions differ to a degree, then the monitor unit 130 can trigger an alarm routine. The degree of difference can vary depending on the program variations. In some implementations using lockstep execution, the executed instructions can have identical opcodes but different operands, if the opcodes differ then the alarm routine can be trigger. In non-lockstep execution, the monitor unit 130 can ensure that execution of the programs variants 110, 111 share the same control flow—that is the monitor 130 ensures the variants 110, 111 execute the same branches and/or other control transfer instructions within a time window. In some implementations, a hypervisor can be used to control execution of the program variants 110, 111 and the monitor 130 can be a part of the hypervisor.

Figure 1B:
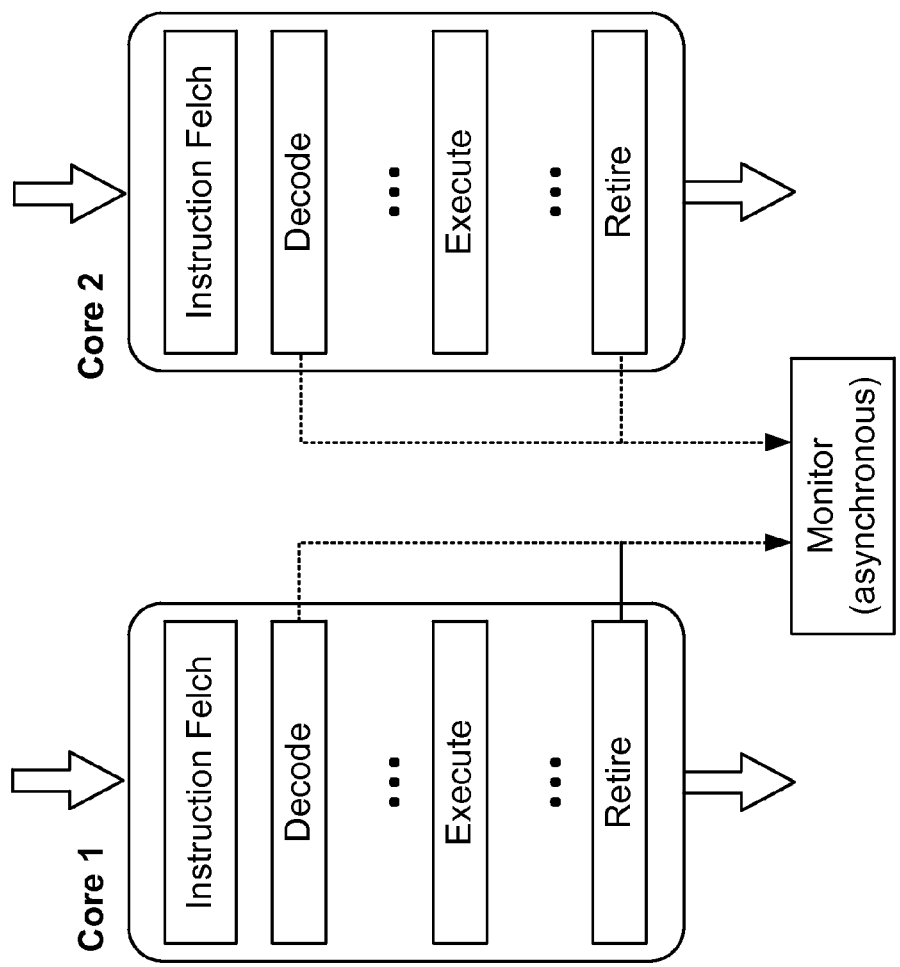
FIG. 1B shows an example of a hardware based monitor.

FIG. 1B shows an example of a hardware based monitor. In this example, all program variants execute in lockstep and the program variants differ solely in how they address data. A status register can tell the processor which of the cores are expected to execute identical opcodes at the same time. Each core forwards the opcodes it has executed to the monitoring component in the order in which instructions were retired. The monitor can verify that graduating instructions from the various cores participating in a computation are functionally equivalent. For example, the monitor, which can be entirely asynchronous, compares the opcodes of the graduating instructions and raises an interrupt if a discrepancy is detected.

Figure 1C:
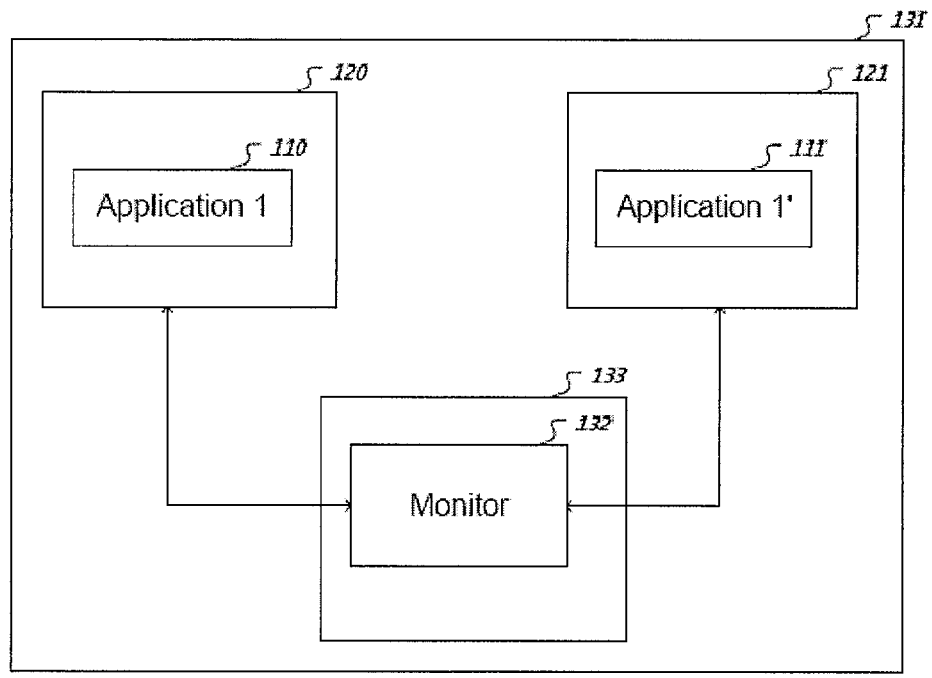
FIG. 1C shows a different example of a multi-core execution environment.

FIG. 1C shows a different example of a multi-core execution environment running different variants of a program. In a processing environment 131, a third processor core 133 can be included. Core 133 can run a software monitor 132. The software monitor 132 can implement the features of monitor 130 in software to control and monitor the execution of program variants 110, 111. In some other implementations, monitor 132 can run on cores 120, 121.

Figure 1D:
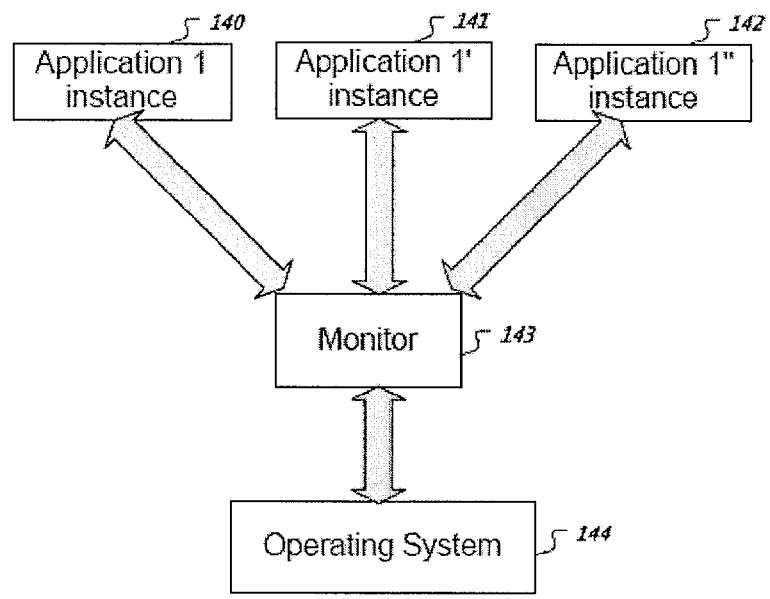
FIG. 1D shows an example of a software implementation of a multi-variant program execution and a monitor.

FIG. 1D shows an example of a software implementation of a multi-variant program execution and a monitor. In a software implementation, a software monitor 142 can control the execution of program variant instances such as instances 140, 141, 142. The software monitor 143 can be situated between the instances 140, 141, 142 and an operating system 144. The software monitor 143 can intercept system calls to the operating system 144 made by the instances 140, 141, 142 to determine if a system call from one instance is equivalent to a system call from the other instances, i.e., the same system call is being invoked by all of the instances and the data being passed to system call is the same. An abnormal behavior can be detected if the control flows of the instances 140, 141, 142 diverge, such is the case when the instances do not produce equivalent system calls or if one instance produces a system call and the other instance does not produce a system call within a time period. If an abnormal behavior is detected, the monitor 143 can suspend execution of instances 140, 141, 142. If no abnormal behavior is detected, the monitor 143 can issue the system call as requested by the instances 140, 141, 142 or the monitor can let one of the system calls from the instances 140, 141, 142 execute. In either scenario, the monitor 143 can distribute the data returned by the system call to all instances 140, 141, 142. In some implementations, the software monitor 143 can run on a processor used to run either of the instances 140, 141, 142 or on a different processor. In some implementations, the monitor 143 can be executed at the user level.

Figure 1E:
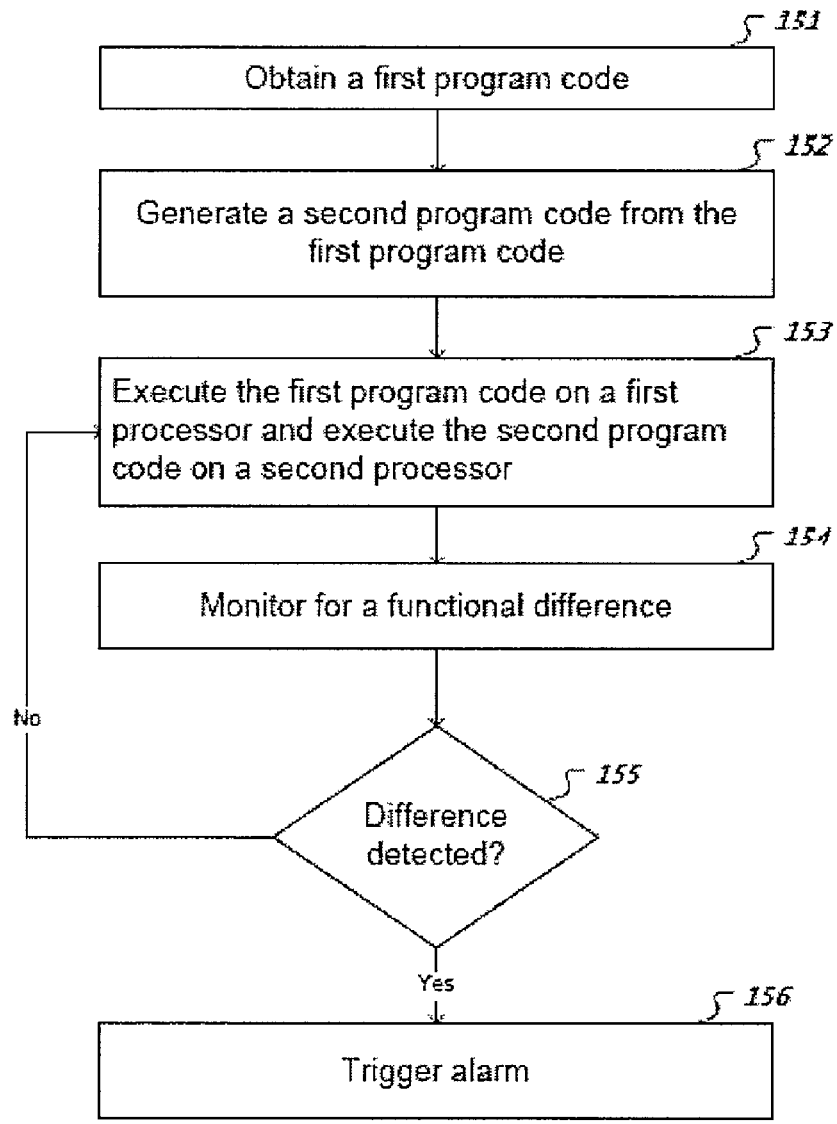
FIG. 1E shows an example of a flowchart for generating and executing multiple program code variants

FIG. 1E shows an example of a flowchart for generating and executing multiple program code variants. A system can obtain 151 a first program code from a storage medium or over a network connection. The system can generate 152 a second program code from the first program code. The first program code and the second program code can be semantically equivalent meaning that they share the same in-specification behavior. The first program code can be altered by a characteristic, such as stack growth direction, register allocation, etc., to produce the second program code. The system can execute 153 the first program code on a first processor and execute the second program code on a second processor. The first and second processors can be cores in a multi-core processor. The system can monitor 154 for a functional difference between the execution of the first program code and the execution of the second program code. If a difference is detected 154, then an alarm can be triggered 156. Otherwise, execution can continue 153.

Figure 1F:
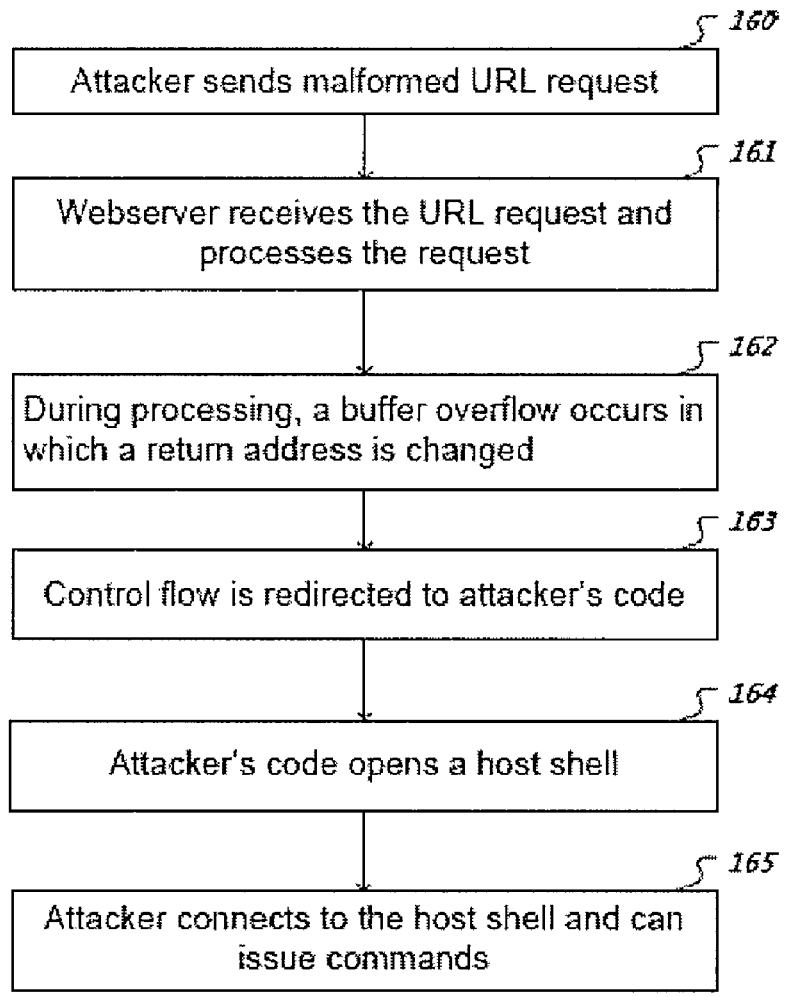
FIG. 1F shows an example of events in an attack scenario without multi-variant program execution.

In FIG. 1F shows an example of events in an attack scenario without multi-variant program execution. A webserver is running on a host. The webserver has a buffer overflow vulnerability. An attacker sends 160 a malformed Uniform Resource Locator (URL) request to the webserver in an attempt to open a host shell. The malformed URL includes attack code. The webserver receives 161 the URL request and processes the request. During the processing of the request, a buffer overflow occurs 162 in which a return address is changed. The processing of the request includes copying the request into a buffer, the copying extends pass the end of the buffer in which a return address is overwritten. Instead of changing control flow to the original return address, control flow 163 is redirected to the attacker's code. For example, the new return address can point to a location within the buffer that contains the malformed URL request which in turns includes attack code. In this scenario, the attacker's code opens 164 a host shell and the attacker connects 165 to the host shell and can issue commands.

Figure 1G:
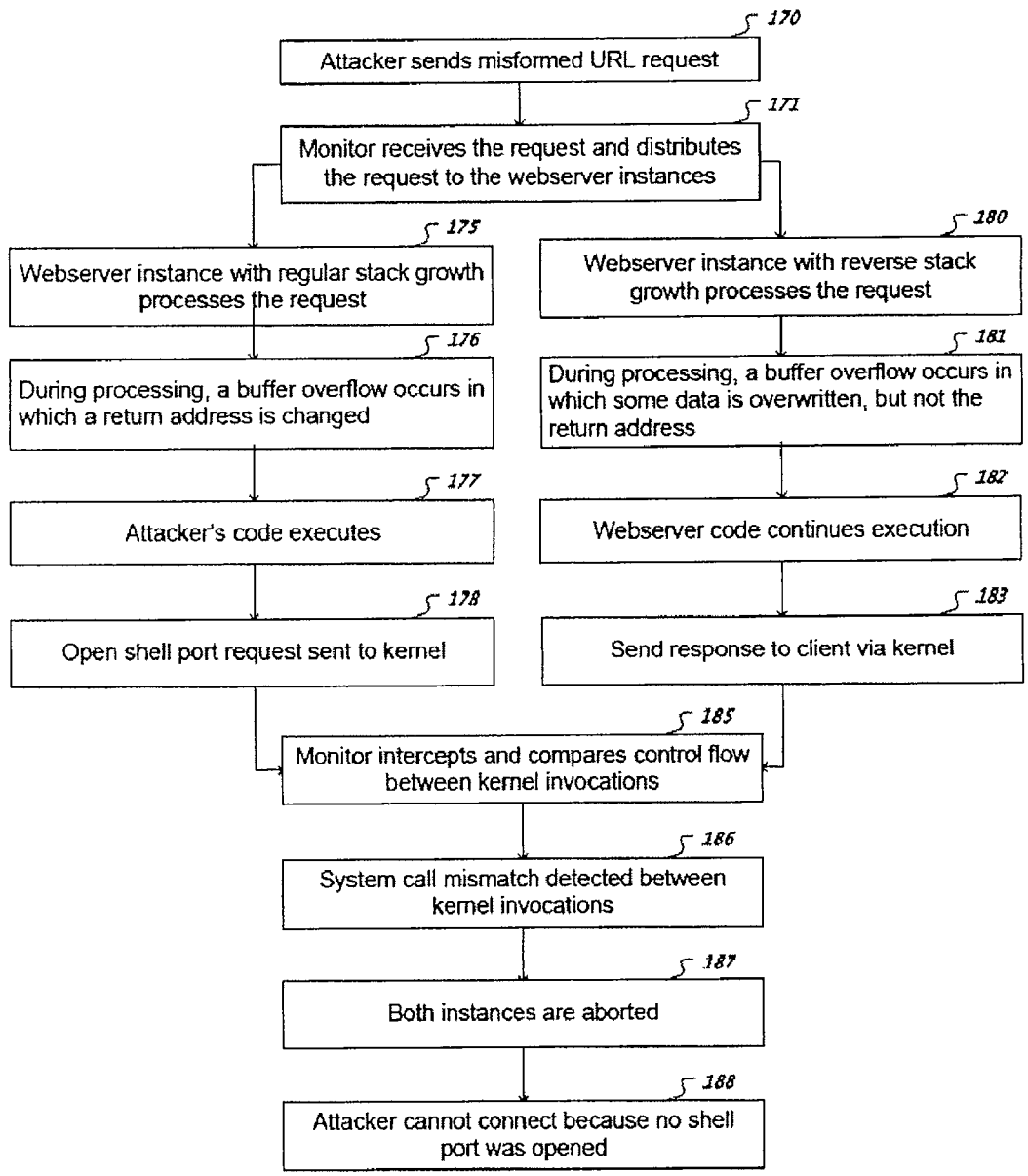
FIG. 1G shows an example of events in an attack scenario with multi-variant program execution.

In FIG. 1G shows an example of events in an attack scenario with multi-variant program execution. A monitor controls and synchronizes the execution of the program variants in this scenario. As with FIG. 1E, a webserver is running on a host and the webserver has a buffer overflow vulnerability. However, two instances of the webserver are running in this scenario. The two instances run variants of the webserver. An attacker sends 170 a malformed URL request to the webserver in an attempt to open a host shell. The monitor receives the request and distributes the request to the webserver instances 171.

The webserver instance with regular stack growth processes 175 the request. During processing, a buffer overflow occurs 176 in which a return address is changed with a portion of the contents of the malformed URL request. Consequently, the attacker's code is executed 177 in which the attacker's code causes an open shell port request to be sent 178 to the kernel.

The webserver instance with reverse stack growth also processes 180 the request. During processing, a buffer overflow occurs 181 in which some data is overwritten, but not the return address because the return address is located at a different position with respect to the location of the buffer. Because the return address is not changed, this instant of the webserver code continues execution 182 and sends 183 a response to the client via the kernel.

Both instances of the webserver eventually invoke the kernel via a system call such as in events 178, 183. The monitor intercepts and compares 185 control flow between kernel invocations. A system call mismatch is detected 186 between the kernel invocations by the two instances. After the mismatch is detected, both instances are aborted 187. Thus, the attacker cannot connect because no shell port was opened 188.

A code variance generator (CVG) is used to generate program code variants. A CVG can employ a broad range of techniques to introduce variance into the program instances that are executed in parallel. These techniques can include, for example, changing the direction of stack growth, register reallocation, heap randomization, code relocation, and OS entry point randomization. One or more variation techniques can be used to generate a program variant. Any number of program variants can be generated. The program variants can be generated from the original program's source code or object code. The program code can be obtained through a local storage medium, such as memory or disk, or over the network.

The code variance generator (CVG) can be a trusted runtime compilation system that automatically generates variants from untrusted binary program code. The CVG can maintain the semantics from the original program code in the variants. Also, the CVG can maintain the sequence of instructions in a program when producing the variants. The CVG can randomize the register assignment, data, and code layouts of the program, because these can be manipulated without affecting the semantics of the executed program instructions. Translation via a CVG can occur transparently, and can happen at the whole program level or dynamically at runtime to produce code variants. In some implementations, translation can be a load-time whole-program translation and/or demand-driven whole-program or chunk-based translation.

Register reallocation can be an effective means for disrupting any attempts to invoke application, library, or OS code from code that was not rewritten by a program code loader. One or more registers can be reallocated between the code variants. Only code passing through the loader is properly adjusted for each individual calling convention of each program instance and thus will not create any discrepancies between instances at runtime. Malicious code, in contrast, enters the system vertically through a buffer-overflow instead of through the regular load path and this will have the same shape across all program instances. Even if the attacker happens to guess the correct calling convention for one of the instances, the same calling convention will be invalid in all other instances and will cause no or different parameters to be passed to the target function, which in turns reveals the presence of the injected code. In some implementations, register reallocation can be applied at the system call interface level. In a system that generates variance across the entire software stack including the operating system, both sides of this interface can be permuted to pass arguments in any random combination of registers, thus defeating any attempts to invoke kernel functions from injected code.

Stack characteristics of a program can also be changed to produce program code variants. Stack characteristics can include a stack's growth direction and a stack's layout. Illustrations of these characteristics are shown in FIGS. 2 and 3.

Figure 2:
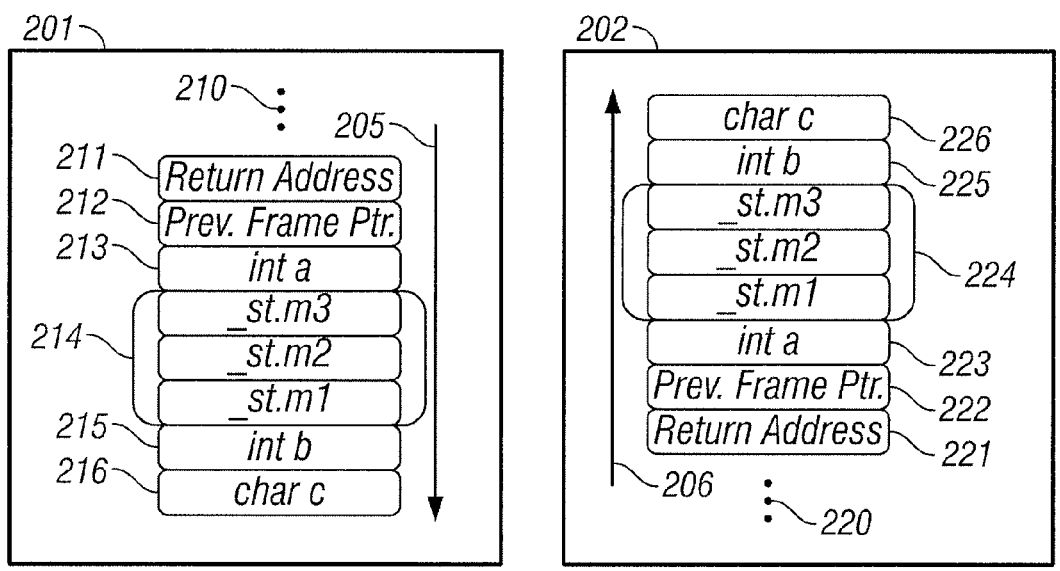
FIG. 2 shows an example of stacks from different program code variants.

FIG. 2 shows an example of stacks from different program code variants. The program code variants to produce stacks 201, 202 can maintain a natural ordering of large data aggregates such as quad word integers (long long), arrays, and C/C++ structures and classes. A first stack 201 grows in a downwards direction 205. A second stack 202 grows in an upwards direction 206. The first stack 201 can include a return address 211, a previous frame pointer 212, and data elements 213, 214, 215, 216. The second stack 202 can include corresponding data from the first stack 201: a return address 221, a previous frame pointer 222, and data elements 223, 224, 225, 226. FIG. 2 shows only a portion of the stack and additional stack elements 210, 220 can be present. The order of the stack elements 211-216 and 226-221 can vary. Compound structures, such as data elements 214, 224, that can include multiple data members can have their internal ordering preserved between stacks 201, 202. Examples of compound structures can include strings, long longs, and data structures.

Figure 3A:
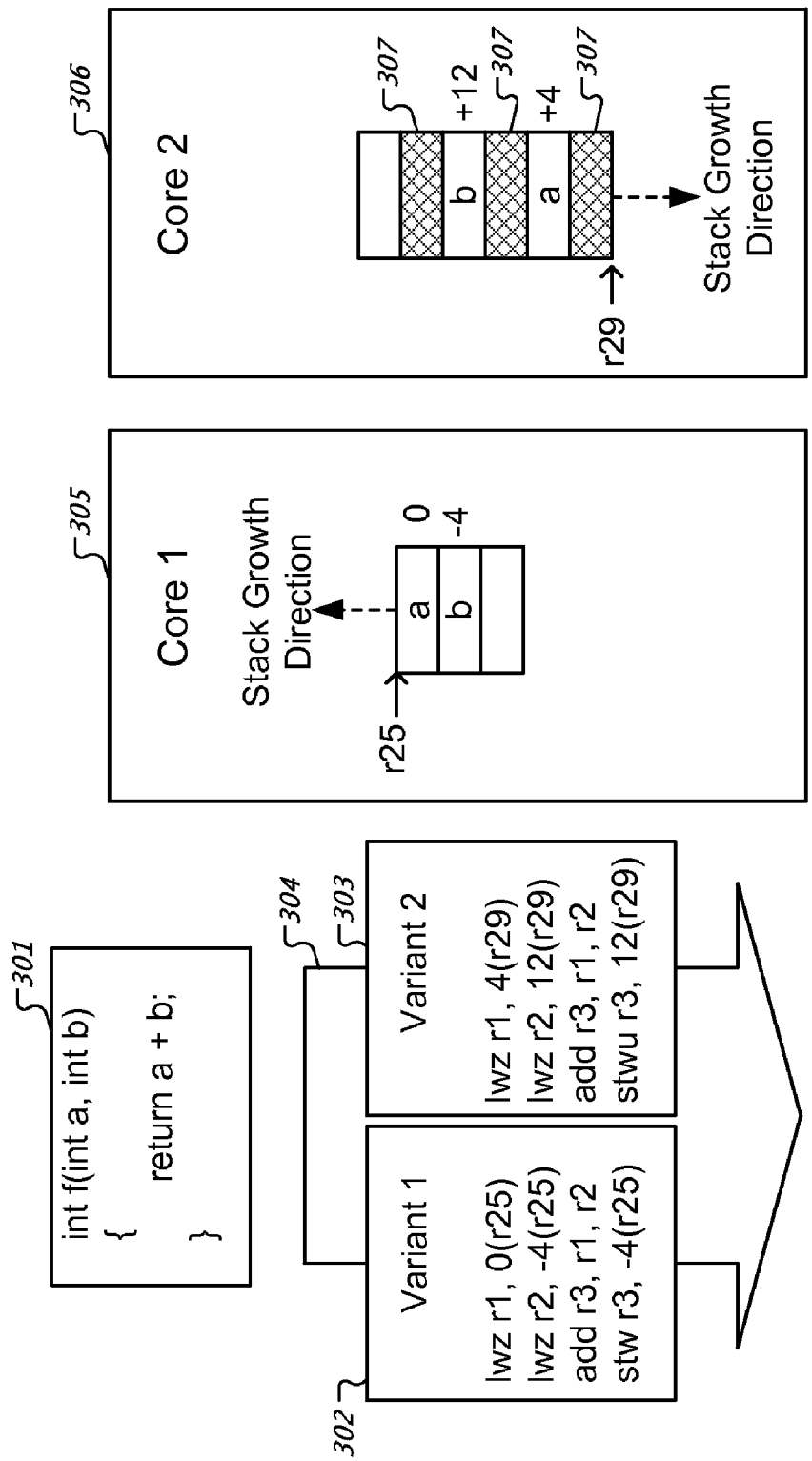
FIG. 3A shows an example of two program code variants and their associated call stacks.

FIG. 3A shows an example of two program code variants and their associated call stacks. An example program code 301 can be used to generate the instructions for two program code variants 302, 303. Direction of execution is illustrated by an arrow 304. Two program code variants 302, 303 can be created that have different stack growth directions as shown by program instances 305, 306. In this example, two program code variants 302, 303 of program code 301 are semantically equivalent, but the variants 305, 306 differ in how they address local variables. Instance 305 of variant 302 grows the stack downwards. Instance 306 of variant 302 grows the stack in a direction opposite that of instance 306 and adds padding 307 between variables on the stack.

Attackers attempting to inject attack code, such as through a buffer overflow, will be faced with the dilemma that the same attack code can have different effects on multiple program variants. For example, an attack vector that successfully overwrites a return address in one instance will have a different effect for the second instance. In order to avoid detection, an attacker would need to independently corrupt the second program instance before any functional differences are detected. Moreover, an attack vector that is designed to corrupt one of the instances will cause collateral data modifications in the other instance. If the variable layout differs between the two program variants, it becomes extremely difficult to devise a symmetrical attack that corrupts both program instances while simultaneously producing semantically identical collateral effects. This is the case even if the attacker completely understands the workings of the variance mechanism and there are only 2 processing elements. Randomization can be added on top of this mechanism, such as a random amount of "spacing out" between variables and a base for register numbering chosen randomly, then the task of an attacker becomes intractable very quickly. Using processors with 4-way, 8-way, or even higher degrees of parallelism will make the barrier to an attack insurmountable even for a well endowed attacker.

Support for arbitrary stack growth directions can vary among processor families. The CVG can be modified to produce different stack characteristics for a particular processor family. For example, Intel x86 supports one native stack direction. The x86 32-bit stack pointer register can point to the last used element on the stack, and the stack grows towards smaller addresses (pre-decrement): a PUSH decrements the stack pointer register before placing another value onto the stack, whereas POP increments the stack pointer register after having fetched the value on top of the stack from memory. Because the x86 PUSH and POP instructions support one specific stack direction (pre-decrement), these instructions can be replaced with pairs other of instructions, such as MOV and ADD, or additional instructions can be added to change the native behavior of the push and pop instructions. The push and pop instructions can be altered before the program is loaded or on the fly, such as during program execution. The remaining x86 instructions that depend on the native pre-decrement stack layout can be changed in a similar fashion.

In order to reverse stack direction, a first approach can replace an indirect PUSH (% EAX) instruction with ADD $8, % ESP, PUSH (% EAX), and ADD $8, % ESP. On x86 microprocessors, the stack pointer ESP points to the last element on top of the stack. Since the stack grows downward, the address of the last element is the address of the last byte allocated on the stack. To allocate space on the stack for N bytes, the stack pointer is decremented by N. This convention can be preserved in an upward growing stack by having ESP point to the beginning of the last element on the stack, which would no longer be the last byte allocated on the stack. In order to allocate N bytes on the stack in this scenario, the amount that the stack pointer has to be incremented by depends on the size of the last element. The stack pointer can point to the first empty slot on the stack when the stack grows upward. With this modification every PUSH/POP instruction can be augmented with instructions that can include an instruction to adjust ESP before these instructions and an instruction to adjust ESP a second time afterwards. When several values are pushed onto the stack in succession, adjacent adjustments can be fused into a single stack correction.

A second approach can be used to adjust the stack pointer. The second approach can be performed by adding or subtracting an appropriate value to and from the stack pointer. In some implementations; the x86 LEA instruction, which can add or subtract to/from a register without modifying condition flags, can be used to adjust the stack point. The indirect PUSH (% EAX) instruction can be replaced with the following instructions: LEA $4, % ESP, PUSH (% EAX), LEA $4, % ESP.

An exemplary third approach can be used to adjust the stack pointer. Table 1 shows example replacement code for the PUSH instruction for both pre-decrement and pre-increment environments. Table 1 shows example replacement code for the POP instruction for both pre-decrement and pre-increment environments.

TABLE 1

Generating alternate instructions for PUSH and POP instructions.

| original code: | original code: |
|---|---|
| pushl %eax | popl %eax |
| pre-decrement: | pre-decrement: |
| addl $-4, %esp<br>mov %eax, (%esp) | mov (%esp), %eax<br>addl $4, %esp |
| pre-increment: | pre-increment: |
| addl $4, %esp<br>mov %eax, (%esp) | mov (%esp), %eax<br>addl $-4, %esp |

The stack layout can also be changed in a variant. If further variance between instances is desired, or more than 4 instances with different stack layouts are desired, holes (padding) can be introduced in the stack layout. In some implementations, every time a value is pushed onto the stack, the stack pointer register can be decremented or incremented (depending on the direction of stack growth) by two words (8 bytes) or more, instead of the traditional single word (4 bytes).

The operating system (OS) can utilize an independent interrupt stack or can run with the stack semantics of an application to avoid overwriting data during an interrupt in instances of programs running with a non-native stack layout.

In some implementations, the stack pointer ESP can be adjusted before and after instructions that manipulate the stack. These instructions can include call (CALL) and return (RET) instructions, since these store and retrieve the return address on the stack. In some implementations, the CALL and RET instructions can be split into separate stack manipulation instructions followed by an indirect branch instruction. In a preferred implementation, the actual CALL and RET instructions can be kept in place to take advantage of a Return Address Stack (RAS). The RAS is a circular last-in first-out structure in some processors that can be used for predicting the target of return instructions. Whenever a call instruction is executed, the address of the instruction after the call is pushed onto the RAS. Upon executing a return instruction, the value on top of the RAS is popped and used as the predicted target of the return. Thus, it is essential to keep call and return instructions in the code to take advantage of the RAS and minimize performance loss. To ensure that the stack is used properly during function calls, the adjustments needed after a CALL are made at the target site of the call and in the epilogue of functions. These adjustments can make ESP pass over the return address placed on the stack by the CALL instruction so that ESP points to the first available slot on the stack.

In certain cases, functions can be invoked using a jump instruction instead of a CALL instruction. This invocation mechanism is called a sibling call. Compilers apply this optimization when a subroutine is called inside a function that immediately returns once the subroutine completes. In this case, the return address of the function can be left on the stack and a jump to the subroutine can be executed. To return to the caller of the function, the subroutine can use a regular RET instruction. To ensure proper semantics for this case, an ESP adjustment can be made only if control is transferred to the function via a CALL. At compile time, it may not be possible to determine whether a function will be entered with a jump because C/C++ allows separate compilation units and the caller and callee functions can be located in different compilation units. In some implementations, the stack pointer can be adjusted at the
beginning of all functions no matter whether the functions are the target of a CALL instruction or are entered with a jump instruction. If a function is invoked by a jump instruction, the stack pointer can be decremented before executing the jump to offset the adjustment that can occur at the call site.

In some implementations, the adjustments after RET instructions can be moved behind CALL instructions. For example, a RET can lead back to the instruction immediately following the CALL instruction in the caller and stack pointer adjustments can then be made. Some functions can pop their own arguments from the stack when they return. For example, in the code generated by GCC version 2.8 and later for functions that return data in memory (e.g., functions that return a structure), the callee can be responsible for the stack clean up. Calling conventions in some programming languages can also force the callee to pop its own arguments (e.g. _stdcall in C/C++). When generating x86 code for these functions, compilers can emit a RET instruction that has an operand indicating the number of bytes that should be popped from the stack when returning from the function. This RET instruction first pops the return address from the stack and stores the return address in the instruction pointer. Then, the RET instruction adds the stack pointer by the value of its operand. When stack grows upward, the stack pointer needs to be decremented rather than incremented. The RET instruction can be replaced with a SUB instruction that decrements the stack pointer and a normal (with no operand)
RET instruction. In this replacement, the value that the normal RET reads is not the correct return address, because the SUB that was added before the RET has changed the stack pointer and it is not pointing to the return address anymore. To compensate, three instructions can be used instead of a stack pointer adjusting RET instruction. These three instructions can include a pop of the return address from the stack into a temporary register, a decrement of the stack pointer, and a jump indirectly to the temporary register. In some implementations, the ECX can be used as the temporary register, because the ECX is a volatile register that is assumed to be clobbered at this point after a function call and is not used to return values to the caller.

Heap randomization can be used to randomize the location of memory objects on the heap. Each program instance can utilize its heap in a random fashion and can be started with a different seed value, statistically increasing the chance that at least one instance will survive a pointer error because the target location overwritten by such a pointer error happens to be unused in that particular instance.

Code relocation can include diversifying the location of code in each program instance. Code relocation can also be used to detect code injection attacks or a return to a library attack such as return-to-lib(c) attacks. It is particularly effective against the return-to-lib(c) attacks since the location of each lib(c) method can be varied across all instances. An attack vector that successfully invokes a library method in one instance can direct the control flow to the same address in other parallel instance. Because the code distribution has been randomized, each instance can execute some other unrelated code at that address, which can cause the program states to diverge and thereby become detectable.

Code relocation can be performed at several layers. For example, load-time relocation of application code can occur. Process-level code relocation by relocating library code can also occur. Relocating code across the entire software stack including the operating system can also occur.

Generating code variants can occur at load-time or dynamically during program execution. When only the application code itself is executed in a multi-variant fashion, whole program translation can be feasible since the entire application code is known at load-time. In environments in which only parts of the entire code are visible at load-time (i.e. dynamic loading of program code, dynamic code generation, or self-modifying code) on-demand translation can be applied. For this, the CVG can translate small chunks of program code at a time, starting from the program entry point and stopping at each indirect or conditional branch instruction. In place of the branch instruction of every newly generated code chunk, the CVG can insert a branch pointing back to the CVG itself. The application code chunk can then be allowed to execute and will return to the CVG once the branch point has been reached. Before translating the next chunk, the CVG can patch the previous chunk with an actual branch instruction to the appropriate (already translated) target address, which can execute directly in future iterations without any further intervention by the CVG.

The CVG can support self-modifying code and dynamically generated code. In some implementations, the Memory-Management Unit (MMU) of the CPU can be used and all memory pages that include rewritten program code can be marked as read-only. If the application attempts to modify code after it has been rewritten, the CPU will raise an exception which can be forwarded to the CVG, which will then invalidate all translations on that page before restoring write access to the page. The page will remain writable without any further interaction by the CVG until the CVG encounters code translation requests originating from that page, at which point the read-only state is restored to trap any further write attempts.

Code variant generation can be assisted by special hardware. Such hardware can include a programmable exclusive-or (XOR) gate in the instruction decoder of each processing element. In some implementations, this hardware can enable each core to execute a different (even if only trivially so) instruction set. The XOR-mask used for each of the processor cores can be chosen at random by the CVG, which can also initialize the appropriate register in each processing element. In some implementations, such a setup can make it increasingly difficult to exploit malfunctions of a hypervisor. In an example scenario, a system might be vulnerable to misconfigurations in virtual memory mapping that can cause all processing elements to execute the identical code (which a monitoring element of the hypervisor would then confirm as being semantically identical). This scenario can be eliminated by making the instruction sets of the individual processing elements mutually incompatible with each other. For example, the CVG, in using the special hardware, can XOR the incoming code with different keys for each parallel instance of the code.

A Multivariant Instruction Set Architecture (M-ISA) can be used to execute program variants, wherein each core can be programmed to execute a slightly modified instruction set architecture. An implementation approach for such a multi-variant ISA can be to add a XOR gate in the instruction decoder that translates the instruction stream using a user-programmable key. During program loading several independent instances of the same program are started. Each execution unit is programmed with a different key and the instruction stream is adjusted accordingly at load-time. If sufficient cores are dedicated, this creates an insurmountable boundary for any attacker trying to design attack code. Only one attack code can be injected, but each instance will interpret it differently because of the individual key in execution unit. Program code is translated (XOR-encoded) at load-time, with each instance using its own key. Once a new copy of the program has been created with the chosen key, the execution unit is programmed with the corresponding key and execution starts. Malicious code, in contrast, can only enter by exploiting a vulnerability, such as a buffer-overflow. In this case, it will not pass through the regular loading sequence, and instead of being able to supply individualized code blocks to each instance each instance will pick up the same malicious code and try to execute it. It does not have to guarantee that the chosen keys will remain secret during program execution. Even if an attacker is able to guess one or several keys, any injected malicious code will still at most be suitable for one thread (or at least have a different effect on each core.)

Figure 3B:
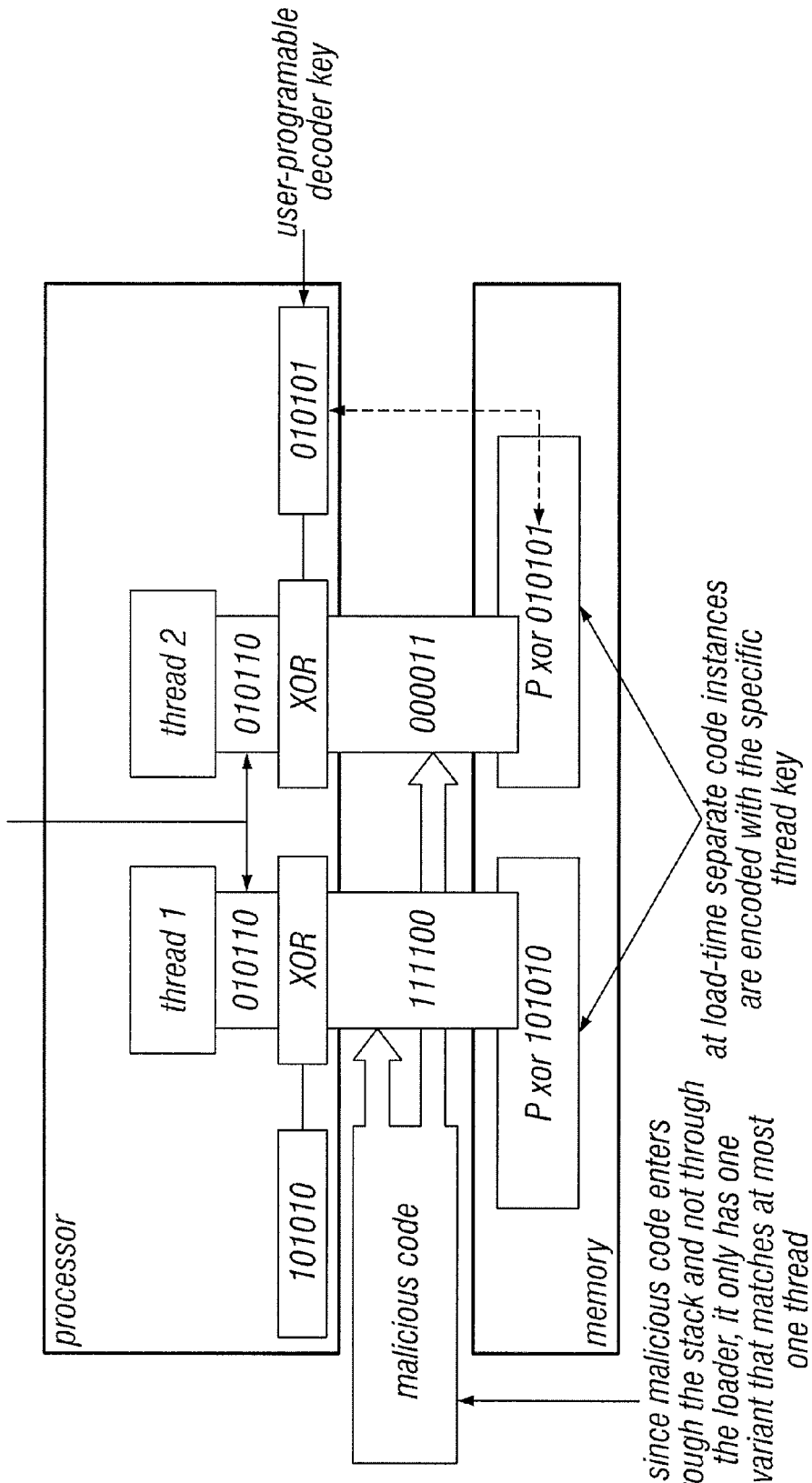
FIG. 3B shows an example of performing a XOR with different keys.

FIG. 3B shows an example of performing a XOR with different keys to illustrate hardware-supported multivariant execution through instruction set diversification. In some implementations, several copies of the program code can be generated at load time, and each copy is encrypted with a unique key. The same key is programmed into each associated execution unit that executes that particular instance. While each thread executes identically instructions, the in-memory representation of the instructions differs for each thread. Any attempt to inject malicious code can be immediately detected, because malicious code does not enter through the regular loader path. Instead, it enters through "side entries" such as a buffer-flow vulnerability, causing each thread to see identical attack-code that has not been (and cannot) be properly specialized for each thread. As a result each thread will try to decode the incoming malicious code with its unique key, resulting in different instruction streams to be executed by each execution unit which is then in turn detected by the monitoring layer.

In OS entry point randomization, the entry points of the operating system itself can be varied across the different versions of the code base executing in parallel. There can be several variants of the whole software stack, including the OS itself, executing in lockstep.

The different program code variants can be created by the software manufacturer, in which case multiple versions are shipped to the consumer. Alternatively, the versions can be generated during installation on the target machine, using an element of randomization. Lastly, the different versions can be created on demand at load time using binary rewriting techniques or during a program's runtime.

A monitor can be responsible for running different program variants in parallel, synchronizing their execution, and supervising their actions. In some implementations, the monitor allows the variants to run without interference as long as they are modifying their own process space. The monitor can isolate the processes executing the variants from the OS kernel and monitors all communication between the variants and the kernel. Whenever a variant issues a system call, this request is intercepted by the monitor and the variant is suspended. The monitor then attempts to synchronize with the other variants of the same program. If they are truly executing the same program in lockstep, then all variants need to be making the exact same system call with equivalent arguments within a small time window. If this condition is not met, an alarm is raised and the monitor takes an appropriate action based on a configurable policy. For example, the action can be that execution of the variants is terminated and subsequently restarted. In other examples, the action can include voting among the variants and terminating the non-conforming variant. The monitor can be implemented in software, hardware, or a combination thereof.

In some implementations, the monitor can be implemented as an unprivileged user-level process that uses the process debugging facilities of the host operating system, such as ptrace in Linux, to intercept system calls. The monitor can be a separate process with its own address space. No other process, including the variants, can directly read from or write to its memory space.

In some implementations, the monitor is notified twice per system call, once at the beginning of the call and once when the kernel has finished executing the call and has prepared return values. When a system call is invoked, the monitor suspends the calling program variant and makes sure that all variants execute the same system call with equivalent arguments. Equivalent arguments do not always mean equal values. For example, when an argument is a pointer to a buffer, the contents of the buffers are compared and the monitor expects them to be the same, whereas pointers (actual arguments) can be different.

After ensuring that the variants have called the same system call with equivalent parameters, the monitor can allow the processes to run the call themselves or the monitor can run the system call on behalf of the processes and pass back only the results to the variants. In the latter case, the monitor can swap out the initially requested call against a low-overhead call that doesn't modify the programs' state, such as getpid. The OS require can require a system function to be performed once that a system call has been made by a program variant. A debugging interface can allow the monitor to execute a different call than was initially requested.

The decision of whether to allow the variants to run a system call or running the system call inside the monitor can be made based on the requested operation. System calls that read information that is immutable, such as reading the kernel version number, are allowed to be executed by all the variants if the result is expected to be same for all. If the system call result is not expected to be the same among all variants (e.g., gettimeof day, getpid), the call can be executed by the first variant and the results are copied to all other variants. System calls that modify the system state (e.g., write data to a sockets or file) can be executed by the monitor. Similarly, file open requests by the application are intercepted by the monitor, and the corresponding file can be opened by the monitor. All operations on the files can be handled by the monitor and the results are copied to the variants. Also, system calls operating on sockets can be executed by the monitor and the variants can receive the results.

The standard input of a variant can be redirected to a pipe whose other end is connected to the monitor. When reading from the standard input, the variants are suspended and the monitor reads its own standard input and writes the read buffer to the pipes connected to the variants' stdin. Then the variants are resumed and can read their stdins. Writes to any file descriptor, including stdout and stderr, can be intercepted and performed solely by the monitor.

System calls, such as mmap, that share memory can be used to create communication routes between variants. Such system calls can be restricted. For example, mmap can be allowed only with MAP_ANONYMOUS and MAP_PRIVATE. MAP_SHARED can be allowed, but only with read-only permission.

In order to compare the contents of indirect arguments passed to the system calls, the monitor can read from the memory of the variants. Also, in order to copy the results of system call execution to the variants, the monitor can write to their address spaces. The monitor spawns the variants as its children and the variants allow the monitor to trace them. The monitor can be executed in user mode.

In some implementations, the monitor can read from the memory of the processes by calling ptrace with PTRACE_PEEKDATA when the variants are suspended. PTRACE_POKEDATA can also be used to write to the variants. Because ptrace only returns four bytes at a time, ptrace has to be called many times to read a large block of memory from the variants' address spaces. Every call to ptrace requires a context switch from the monitor to the kernel and back, which makes this technique inefficient for reading large buffers. To improve performance, two pipes can be created between the monitor and each variant, one for reading (read-pipe) and one for writing (write-pipe). In order to start running the variants, the monitor spawns child processes using fork and then runs given executables inside of these children. The communication pipes are created after the children are spawned and before executing the variants. To keep the pipes open after the execution of the variants, the monitor uses execve to start their execution.

The monitor can read/write from/to the address spaces of the variants when they are suspended at a system call. In case of a read, the monitor replaces the original system call with a write to the read-pipe, giving it the address of the buffer that the monitor needs to read and its length. The variant is resumed and the kernel executes the write and writes the context of the variant's memory to the read-pipe. The OS notifies the monitor after executing the call and the monitor reads the contents of the buffer from the pipe at once using a single read. Writing to the variants' memory is performed in a similar way, but the monitor first writes the data to the write-pipe and then the system call is replaced by a read from the pipe to a desired address with the specified length.

In certain cases, after the original system call has been replaced by a read or write, it must still be executed by the variant. In this case, the system call and its arguments are restored from a backup copy taken before the replacement and the instruction pointer, such as the EIP in x86, is decremented to point back to the original system call. Then the variant is resumed and immediately calls the same system call again. This time, the monitor knows that the arguments are equivalent and allows the call to be executed by the variant.

In some implementations, a Monitoring and Synchronization Layer (MSL) can be used. During a multi-variant parallel execution of a program, the MSL can be responsible for distributing program input over all parallel instances, synchronizing the behavior of the parallel instances, comparing the state and output of each state to ensure that no program instances has been corrupted. Monitoring for corruption, such as for functional differences, can occur at varying granularities, ranging from a coarse-grained approach that checks that the final output of each instance is identical all the way to a (potentially hardware-assisted) checkpointing mechanism that periodically compares the register and memory state of each parallel execution unit to ensure that they still execute semantically equivalent instructions in lockstep. The MSL can be implemented in software, hardware, or a combination thereof.

In some implementations, a coarse-grained monitoring approach synchronizes program instances at the system call level. System calls can include those interacting with external input/output such as user input, read/write access to data storage devices, and read/write access over network connections. Coarse-grained monitoring can assume that program instances are still executing functionally equivalent code as long as each instance produces equivalent system calls with equivalent data to those system calls.

For example, if instance A requests 400 bytes to be read from a file, all other instances are expected to issue the same request within a certain time window. Large delays between the arrival time of instances are unlikely since each instance is executed by its own processor element and thus should proceed at an approximately identical pace. Instances that fail to submit a matching request, or issue any other request are considered tainted and can be quarantined. Once all instances have arrived at the checkpoint, the underlying file read operation is executed (exactly once), and a copy of the data can be returned to all instances. In case of a write request, a similar synchronization can take place. The output of all instances is gathered, and one copy is written to the disk or network socket once all instances have reached the synchronization point.

Coarse-grained monitoring can be highly efficient, because synchronization and monitoring only happens during library calls (or system or hypervisor calls respectively). This can thwart a large subset of code injection attacks, because the attacker would have to supply individual exploit code to each instance due to the inherent variance between program instances. To do so, however, the attacker would need to send a series of attack vectors, and each attack vector (e.g. network packet) will have to pass the application/library code boundary individually, every time triggering a resynchronization and shutting down (and restarting) of any previously tainted instances.

A software-based checkpointing approach can verify program state at regular intervals. The software-based checkpointing approach can use hardware breakpoints. For example, the Intel x86 processor supports hardware breakpoints that can be used to trigger an exception at the same predetermined program location across all instances. In addition to coarse-grained monitoring, the software-based checkpointing approach can be used to compare the program state at various checkpoints.

For example, if register reallocation is applied to create diversity in the variants, the content of all registers must still match, and this can be verified. The checkpointing does not necessarily have to happen in a synchronized fashion in contrast to the coarse-grained output monitoring. Instead, it is sufficient if each instance delivers its snapshot data into a scratch area, or an external source grabs that data and places that data into the scratch area, where the data is then analyzed and compared by a checkpointing thread while the original thread is allowed to proceed. The only requirement is that a thread has to wait until the checkpoint thread has certified its checkpoint state before it is allowed to issue any library or system calls.

The systems and techniques can support the execution of multithreaded code. If one thread issues a system call, for example, all corresponding sister threads in all other instances are expected to do the same, while any other unrelated thread is permitted to continue. The synchronization layer can determine which threads are related, and which are not. For example, all threads forked at a same synchronization point in different instances are related.

Figure 4:
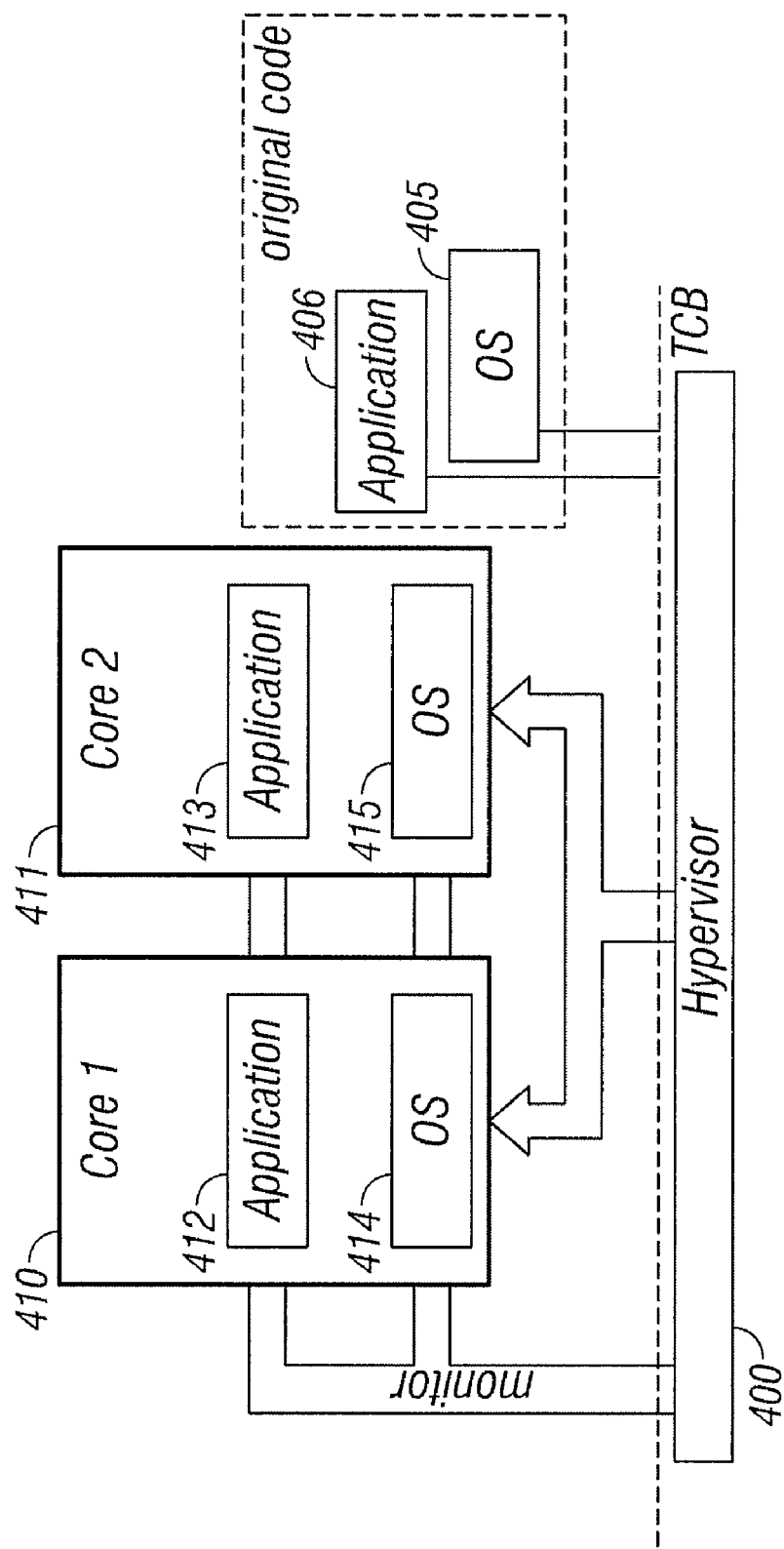
FIG. 4 shows an example of a hypervisor with processor cores running stack variants of an application.

FIG. 4 shows an example of a hypervisor with processor cores running stack variants of an application. Hypervisor 400 can be used to run several different yet semantically equivalent program code variants 412, 413 of an application 406 on processor cores 410, 411 respectively. In some implementations, a program code variant can be an exact copy of the application under execution. The hypervisor 400 can be used to run several different yet semantically equivalent copies 414, 415 of an OS 405 on cores 410, 411 respectively.

The hypervisor 400 can provide hardware virtualization. Hardware virtualization can provide each instance of the OS 414, 415 with the exact same device state. The hypervisor 400 can coordinate the distribution of input, such as processor and I/O events, to the different instances of the operating system 414, 415 running in parallel. For example, a packet from the network can be distributed by the hypervisor 400 to all concurrently executing variants 412, 413 of the application. The hypervisor can detect a behavior from the first instance of the operating system 414 and compare the behavior to the second instance of the operating system 415 to detect a functional difference. Behaviors can include attempts to access hardware such as a network interface or a storage medium.

The hypervisor 400 can create storage address remappings, i.e., a different assignment for each concurrently executing version of the application. For example, the remappings can include variations in register usage and in global and local addressing of variables. These remappings can be applied to all executable code.

The hypervisor 400 can include a CVG. The CVG can translate both operating system and application code on demand. The CVG can translate code in chunks. In some implementations, a code chunk can be translated by the CVG when control flow reaches the chunk. A translated code chunk can be cached so that if control flow reaches the chunk again, the previously translated code can be reused. In some implementations, the CVG can translate dynamically generated and self-modifying code. For example, a Memory Management Unit (MMU) associated with the processor core 410, 411 can be used to detect attempts to overwrite existing program code. The detection can trigger the CVG to translate the new program code.

The hypervisor 400 can provide hardware-assisted instruction-by-instruction checkpointing. The hypervisor 400 can monitor a checkpointing unit that can verify that the graduating instructions from cores 410,411 participating in running program code variants 412, 413 of an application and/or variants of an OS 414, 415 are functionally equivalent. In some implementations, a checkpointing unit can operate asynchronously with respect to the graduating instructions from processor cores 410,411 so as not to preclude out-of-order execution on cores 410, 411. The checkpointing unit can provide different degrees of strictness as to how closely the instruction streams from cores 410, 411 would be required to match. A checkpointing mode can be configured to control the degree of strictness. In some implementations, one checkpointing mode can involve monitoring the cores 410, 411 to determine whether the cores 410, 411 execute identical opcodes at the same time. The opcode can specify an instruction's type such as an add or load. In some implementations, a checkpointing interval can be employed to require the cores 410, 411 to synchronize on branch instructions. For example, whenever one instance of a multi-version execution set arrives at the end of a basic block, all others must do so also. In some implementations, the checkpointing unit can require hardware based synchronization on supervisor calls.

In some implementations, cores 410, 411 can include flags to control the checkpointing mode. These flags can be stored as values in registers. These flags can be in user space and need not be protected. All that is required is that the hardware will enforce the strictest rule requested by any of the cores 410, 411. Hence, since as long as at least one core remains uncorrupted in a computation, the hardware can enforce checkpointing at least to the level requested by that core. It can be assume that a malicious intruder would attempt to lower the level of checkpointing or turn checkpointing off altogether, since it can be hard to construct malicious code that would be checkpointing-compatible with the legitimate code that the malicious replaces.

Figure 5:
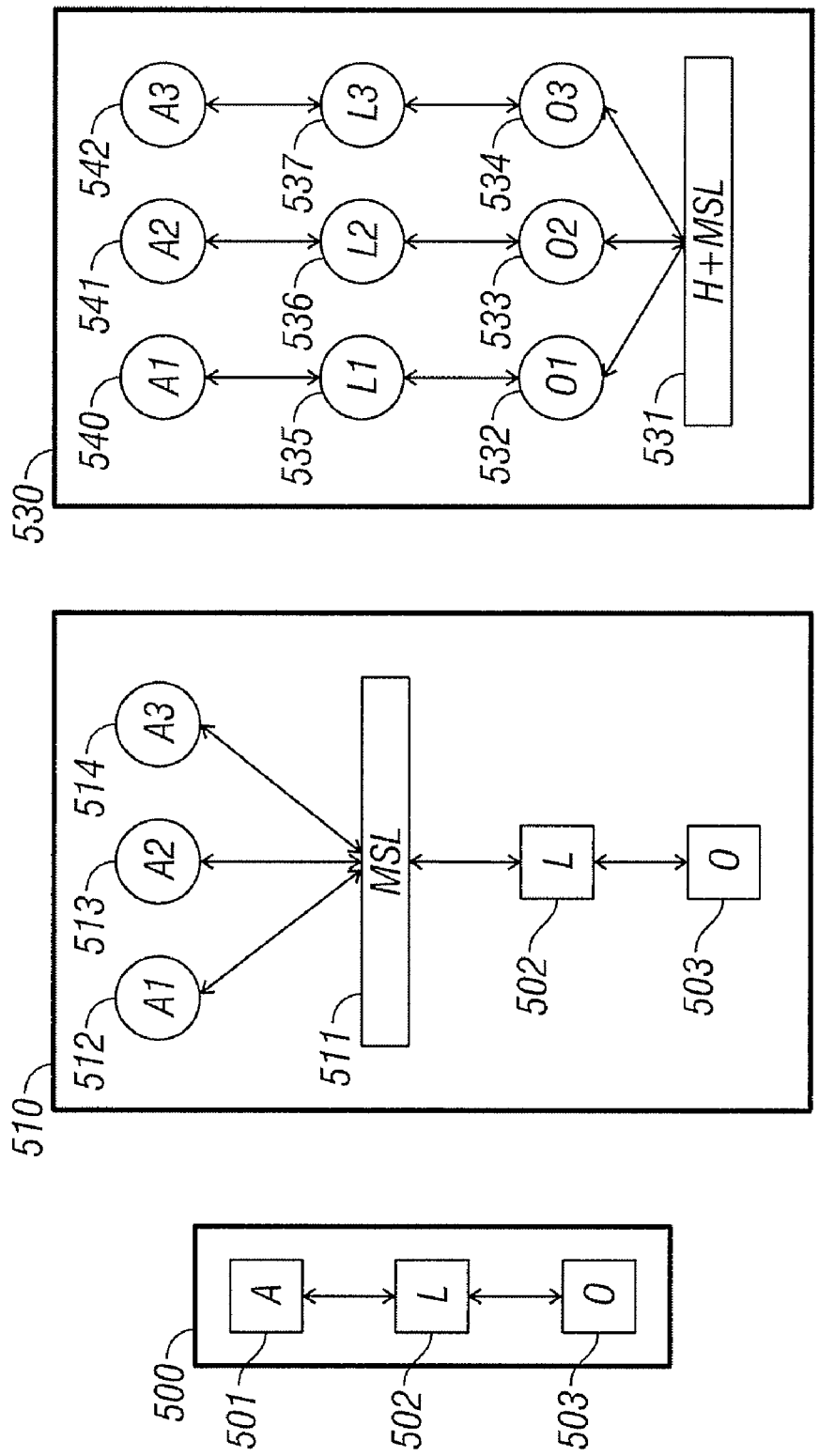
FIG. 5 shows examples of three different execution styles.

FIG. 5 shows examples of three different execution styles 500, 510, 530. Multi-variant parallel execution can be performed at several levels, from an application-only use of multi-variant execution all the way to full parallel virtualization of the complete software stack. For reference, a first execution style 500 is non multi-variant and can include an application 501, libraries 502, and OS 503. A second execution style 510 shows an application-only application of multi-variant execution wherein the MSL 511 can be used to monitor and synchronize variants 512, 513, 514 of an application. A third execution style 530 shows a full parallel virtualization of the complete software stack. Style 530 can include a combined hypervisor and MSL 531 on top of which runs OS variants 532, 533, 534, library variants 535, 536, 537, and application variants 540, 541, 542.

In the application-level parallel execution scenario, such as execution style 510, an application code runs in multiple instances. A trusted code base can include a CVG, a MSL, as well as the entire library and operating system code. Every time the application code invokes a library method, the instances can be synchronized and the arguments of the library invocation are compared across all instances. Similarly, any data returned by the library layer is distributed equally over all parallel instances. Application-level parallel execution offers the fewest security guarantees in comparison to the more comprehensive approaches, but is also the least complex scenario to implement.

In a variant of application-level parallel execution, process-level parallel execution can remove the library code from the trusted code base by executing the entire library stack in multiple versions in addition to the application code. To ensure that all instances execute semantically equivalent code, all input processed by each instance needs to be equivalent across the instances. This can apply to direct program input such as data read from files or network sockets, and any seed value used by a pseudo-random number generator in the system library. It is important to realize that as long as each instance sees the exact same seed value, each random number generator will produce the exactly same sequence of pseudo random numbers.

A machine-level parallel execution where the entire software stack is subject to multi-variant execution, such as execution style 530, can ensure that each instance of the operating system sees the same device state by having all devices virtualized by a hypervisor. A hypervisor functions can include a code variance generator and monitoring and synchronization components. A hypervisor can monitor each instance of the operating system to ensure that each instance makes the same requests to the hardware level.

The system can quarantine and repair infected instances. If a sufficient number of execution units are used to execute variants of a program, the monitoring layer can perform majority voting based on the program states of each instance at a checkpoint. As long as a sufficient number of instances agree on one particular state execution, the monitoring layer can let those instances in the majority continue and the infected cores can be disconnected and quarantined.

The degree of reliability of the quarantine is dependent on the number of threads executing the program in parallel and the number of threads that were successfully taken over by the malicious code attack. Since systems only have a limited amount of resources, the number of threads per program will likely depend on how security critical the application is. For example, a highly security sensitive transactional application can be worth dedicating 16 parallel threads for maximum protection, while less important tasks can execute two-way parallel per default.

Figure 6:
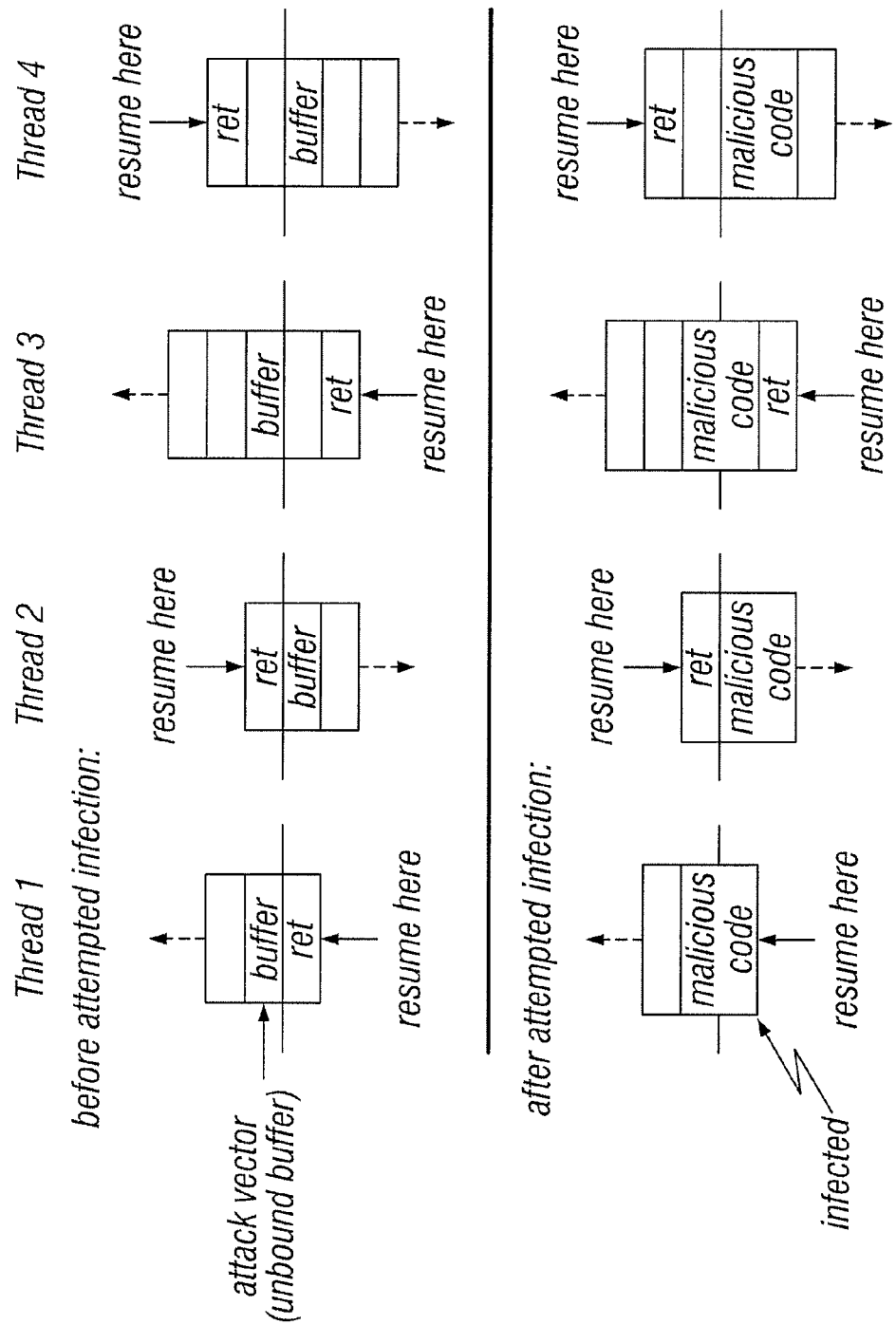
FIG. 6 shows an example of an attempted malicious code injection through an unbounded buffer.

FIG. 6 shows an example of an attempted malicious code injection through an unbounded buffer. Because the original program is executed in four parallel multi-variant instances, the attack only succeeds in one thread. The reason for this is that each thread exposes the same attack vector, but reacts differently to the (identical) code the attacker tries to injection. In case of thread 1 the return address is successfully overwritten by the malicious code and the attacker gains control over the thread. In thread 2 the attempt fails since the stack has a different growth direction. Thread 3 and thread 4 are resilient to this example attack as well since spacer cells between stack values are used and the malicious code does not reach far enough to overwrite the return address. At the next synchronization point the monitoring layer can detect that threads 2, 3, and 4 still agree on a common state, and thread 1 can be disconnected.

In some implementations, the hypervisor can quarantine code variants and effect repair. If a sufficient number of processor cores are available and dedicated to security, intrusions can be transparently repaired after being detected. Assuming that N processor cores are available for multi-variant code execution, a checkpointing interval can be selected so that an attacker can corrupt at most (N/2)−1 program instances between checkpoints. If an intrusion is subsequently detected, the correct state can be determined by way of majority voting. Program instances that upon inspection are determined to have been corrupted can then be quarantined and can be terminated. Instances that were not corrupted can continue to run. In some implementations, the corrupted program instances can be allowed to continue in order to monitor the actions of the attacker.

Multi-variant program execution can alter various registers, memory regions, and program states. Program state can include register bank state and main memory state. The main storage area for programs can be main memory. Two models can address the memory state during program execution: (a) shared memory state and (b) variant memory state. Under the shared memory state model, all parallel instances of a program share a uniform memory state. As long two instances only differ in register mapping, this can be enforced. Each instance executes identical instructions with identical register contents but variant register names. It can be desirable to reconcile this approach with multi-variant execution using stack variance. This introduces a number of subtle problems. For example, if two instances execute with different stack cell spacing—i.e. one instance with zero stack cell spacing, and the other with one word cell spacing—an object allocated onto the stack will have a different memory address for each instance this the stack of the instance using stack spacing grows faster.

Figure 7:
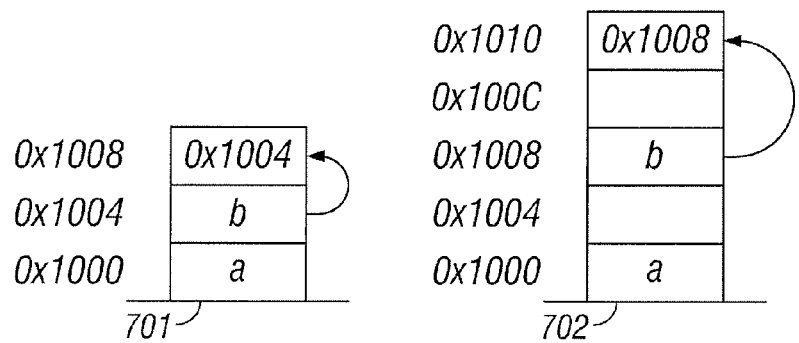
FIG. 7 shows an example of an object address mismatch between stack variant instances of the same program.

FIG. 7 shows an example of an object address mismatch between stack variant instances of the same program. The left instances 701 executes with a zero-spaced stack. The address of stack object b is 0x1004. The right instance 702 executes with a stack that has a fill word after each stack cell and thus the address of stack object b is 0x1008 here. These two instances 701, 702 cannot be executed in a shared memory environment since the two stacks access patterns would interfere with each other.

A similar problem arises if multiple instances read and subsequently update the same memory location. If this is not done in lockstep by each instance, some instances might read the already updated value, written to the address by some other instances.

One possible approach to overcome this problem with existing hardware and in pure software is to use the Memory Management Unit (MMU) present in modern processors to assign each instances its own private virtual memory that it modifies locally. Each instances will execute in and modify disjunct memory regions, even though each instance is using the same uniform virtual memory layout to address that memory region.

Figure 8:
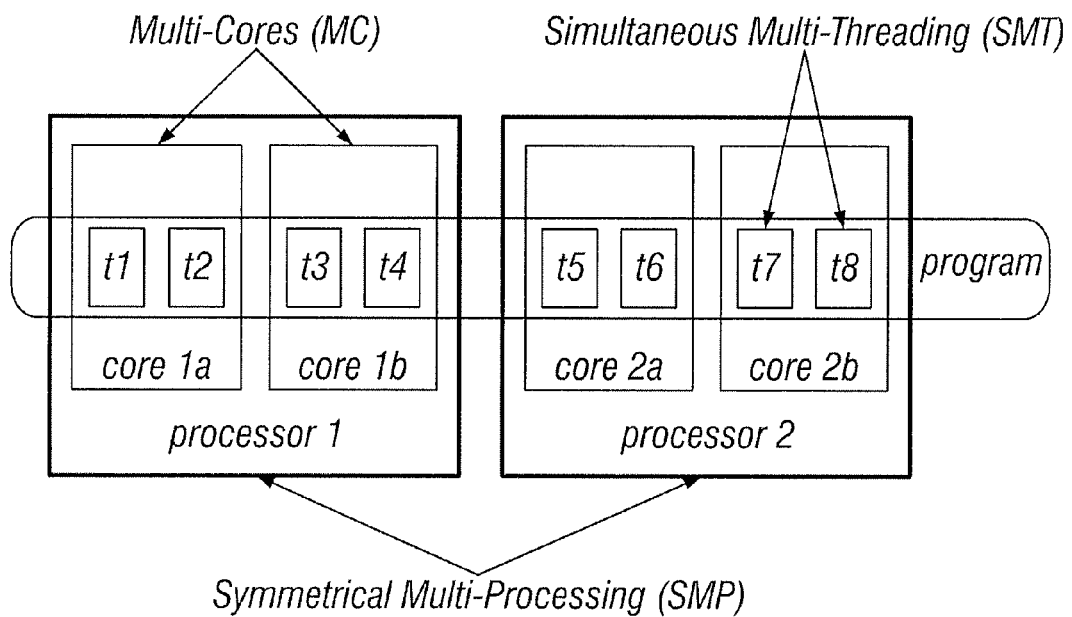
FIG. 8 shows an example of a multi-core processor.

FIG. 8 shows an example of a multi-core processor. In this example, two processors (processor 1 and 2) with two cores each (core a and b) execute a separate instance of the same program with each of two execution units (simultaneous multi threading) of each core. In other examples, the execution units can be separate processor cores. Its important to note that each execution unit executes the same program at a semantic level, but not necessarily the same instruction stream. Multi-variant program execution detects malicious code injection by monitoring each execution for subtle differences resulting from each execution unit running a slightly different instruction stream variant, even though each instruction stream performs semantically equivalent computations.

In some implementations, monitoring can occur at the granularity of software chunks. As applied during execution, a chunk is a sequence of instructions that can be rolled back completely so that the chunk leaves no change to the global state of the computation when rolled back. For example, a processor can temporarily delay write operations to memory by queuing the write operations from a chunk in a buffer of a certain size. Changes to memory can become permanent once that the writes that are queued in the buffer are committed. In some implementations of multi-variant execution, each chunk of instructions becomes a transaction that is committed to memory only if the monitoring layer determines that all instances are still functionally equivalent. If the monitoring layer determines that no deviation has occurred between chunk checkpoints, the monitor considers that it is safe to commit these changes to memory. If the variants deviate, then the monitoring layer has several options. In implementations that have three or more variants executing in parallel, majority voting can be used to determine which variants have been corrupted and which variants have not been corrupted. The monitor can roll back the corrupted versions and commit the rest, or not commit at all.

Figure 9:
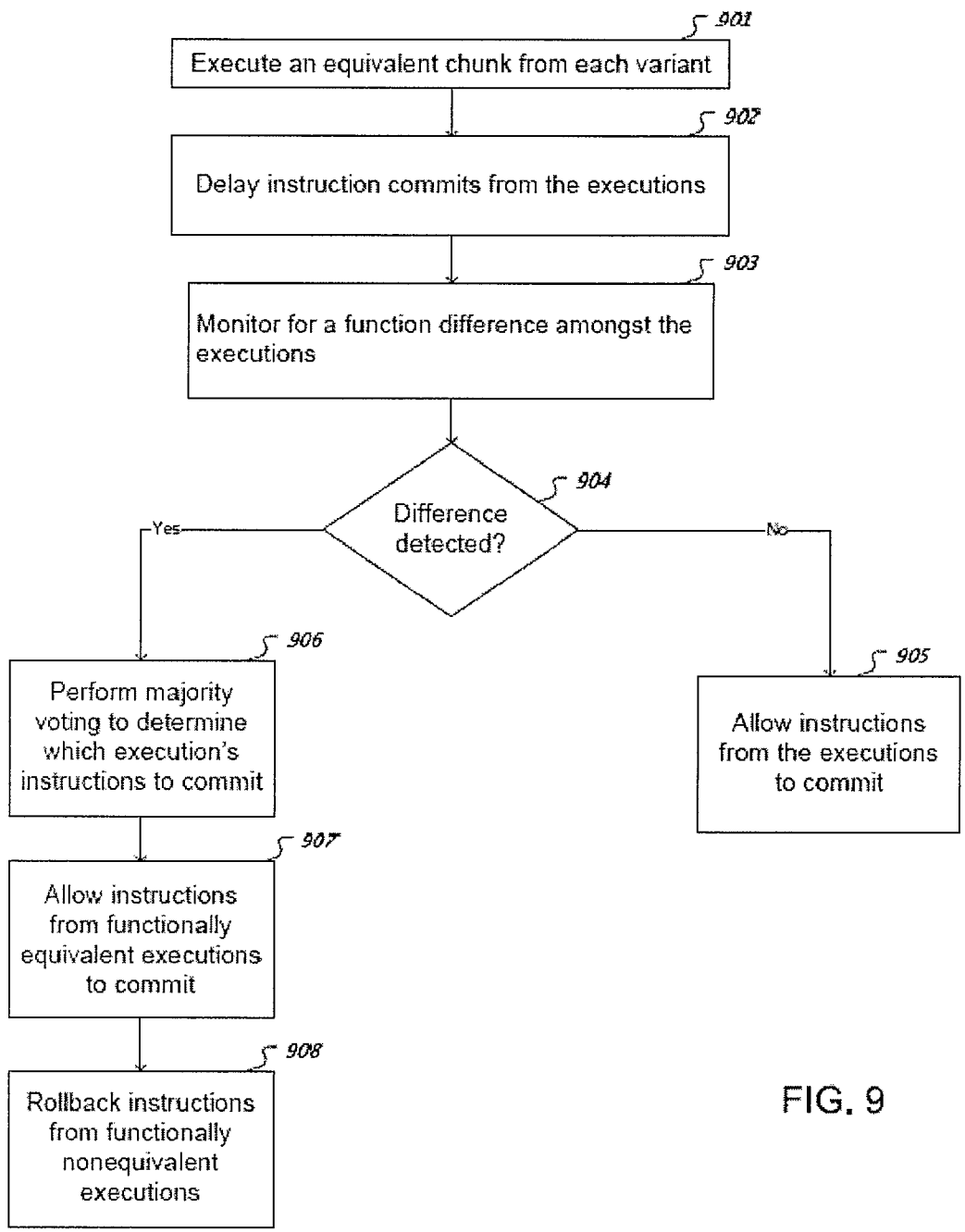
FIG. 9 shows an example of a flowchart of multi-variant execution in which instruction execution can be rolled back.

FIG. 9 shows an example of a flowchart of multi-variant execution in which instruction execution can be rolled back. A system can execute 901 an equivalent chunk from each variant of a program code. The system can delay 902 committing instructions from the executions. The system can monitor 903 for a function difference amongst the executions. If a functional difference is not detected 904, then the system can allow instructions 905 from the executions to commit. If a functional difference is detected 904, the system can perform majority voting 906 to determine which execution's instructions to commit, allow instructions 907 from functionally equivalent executions to commit, and rollback, or cancel, instructions 908 from functionally nonequivalent executions.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of what is disclosed here, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet. A computer system for implementing the disclosed embodiments can include client computers (clients) and server computers (servers). A client and a server are generally remote from each other and typically interact through a communication network. The relationship of client and server can arise by virtue of computer programs running on the respective computers and having a client-server relationship to each other. While this specification contains many specifics, these should not be construed as limitations on the scope of any invention or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments of the invention have been described. Nevertheless, it will be understood that various modifications may be made without departing from the spirit and scope of the invention. Accordingly, other embodiments are within the scope of the following claims.

What is claimed is:

1. A method for controlling operation of a program code in a computer system, comprising:
   obtaining a first program code that effects a first call stack to grow in a first direction; generating a second program code from the first program code that effects a second call stack to grow in a second direction that differs from the first direction, wherein the first program code and the second program code are semantically equivalent;
   executing the first program code to produce a first executed instruction comprising a first instruction type;
   executing the second program code in lockstep with the execution of the first program code to produce a second executed instruction comprising a second instruction type; and
   comparing the first instruction type to the second instruction type to detect an abnormal behavior.

2. The method of claim 1, further comprising:
   suspending execution of the first program code and execution of the second program code when the abnormal behavior is detected.

3. The method of claim 1, wherein the second call stack comprises padding between a first member of the second call stack and a second member of the second call stack.

4. The method of claim 1, further comprising operating a first processor to execute the first program code and the second program code.

5. The method of claim 1, further comprising operating a first processor to execute the first program code and a second processor to execute the second program code.

6. The method of claim 1, wherein generating the second program code from the first program code comprises using a source code representation of the first program code to generate the second program code.

7. The method of claim 1, wherein generating the second program code from the first program code comprises using an object code representation of the first program code to generate the second program code.

8. A method for controlling operation of program code in a computer system, comprising:
   obtaining a first program code;
   selecting a first characteristic from a plurality of characteristics, wherein the plurality of characteristics comprises a direction of stack growth, padding between call stack members, register allocation, and heap allocation;
   generating a second program code from the first program code by altering the first characteristic of the first program code, the second program code being different from the first program code, wherein the first program code and the second program code are semantically equivalent;
   executing the first program code;
   executing the second program code; and
   monitoring for a functional difference between the execution of the first program code and the execution of the second program code to detect an abnormal behavior.

9. The method of claim 8, wherein monitoring for the functional difference comprises monitoring for a divergence of control flow between the execution of the first program code and the execution of the second program code.

10. The method of claim 8, further comprising:
    distributing input data to the execution of the first program code and the execution of the second program code, wherein monitoring for the functional difference comprises monitoring for the functional difference between the execution of the first program code and the execution of the second program code in response to the input data.

11. The method of claim 8, wherein the first characteristic comprises a direction of stack growth.

12. The method of claim 8, wherein executing the first program code occurs in lockstep with executing the second program code, wherein the monitoring for the functional difference comprises comparing a first instruction from the execution of the first program code to a corresponding second instruction from the execution of the second program code, wherein the functional difference occurs if the first instruction differs in instruction type from the second instruction.

13. The method of claim 8, further comprising executing the monitoring for the functional difference when either the execution of the first program code or the second program code reaches a control transfer instruction.

14. The method of claim 8, further comprising executing the monitoring for the functional difference when either the execution of the first program code or the second program code reaches a system call.

15. The method of claim 8, further comprising:
    detecting the functional difference; and
    suspending the execution of the first program code and the execution of the second program code after detecting the functional difference.

16. The method of claim 8, further comprising:
    generating a third program code by altering a second characteristic of the first program code, wherein the first program code and the third program code are semantically equivalent;
    executing the third program code, wherein monitoring for the functional difference comprises monitoring for the functional difference between the execution of the first program code, the execution of the second program code, and the execution of the third program code.

17. The method of claim 8, wherein generating the second program code from the first program code comprises using a source code representation of the first program code to generate the second program code.

18. The method of claim 8, wherein generating the second program code from the first program code comprises using an object code representation of the first program code to generate the second program code.

19. The method of claim 8, further comprising executing the monitoring for the functional difference at user-level.

20. The method of claim 8, wherein executing the first program code comprises advancing the execution of the first program code to a first system call, wherein executing the second program code comprises advancing the execution of the second program code to a second system call, wherein monitoring for the functional difference comprises determining if the first system call is equivalent to the second system call.

21. The method of claim 20, further comprising detecting the abnormal behavior when the second system call occurs more than a period of time after the occurrence of the first system call.

22. The method of claim 20, further comprising allowing an execution of the first system call based on whether the first system call is equivalent to the second system call.

23. The method of claim 8, wherein the monitoring for the functional difference occurs between a transfer of control flow between an operating system and the execution of the either the first or second program code execution.

24. The method of claim 8, wherein executing the first program code comprises executing the first program code on a first instance of an operating system and executing the second program code comprises executing the second program code on a second instance of the operating system.

25. The method of claim 24, wherein the monitoring for the functional difference comprises comparing a first behavior of the first instance of the operating system to a second behavior of the second instance of the operating system.

26. The method of claim 8, further comprising operating a first processor to execute the first program code and the second program code.

27. The method of claim 8, further comprising operating a first processor to execute the first program code and a second processor to execute the second program code.

28. A method for controlling operation of a program code in a computer system, comprising:
 executing a first program code with a first call stack associated with the execution of the first program code that expands in a first direction;
 executing a second program code with a second call stack associated with the execution of the second program that expands in a second direction, wherein the second program differs from the first program code to effect the second direction to be opposite from the first direction; and
 monitoring for a functional difference between the execution of the first program code and the execution of the second program code to detect an abnormal behavior.

29. The method of claim 28, further comprising executing the monitoring for the functional difference at user-level when either the execution of the first program code or the second program code reaches a system call.

30. The method of claim 28, wherein the second call stack comprises padding between a first member of the second call stack and a second member of the second call stack.

31. The method of claim 28, further comprising operating a first processor to execute the first program code and the second program code.

32. The method of claim 28, further comprising operating a first processor to execute the first program code and a second processor to execute the second program code.

33. A system for controlling operation of a program code in a computer system, comprising:
 a first processor core that executes a first program code to produce a first instruction;
 a second processor core that executes a second program code to produce a second instruction, wherein the second program code differs from the first program code by a characteristic, wherein the first program code and the second program code are semantically equivalent, wherein the second processor core executes in lockstep with the first processor core, wherein the characteristic is selected from a plurality of characteristics, wherein the plurality of characteristics comprises a direction of stack growth, padding between call stack members, register allocation, and heap allocation; and
 a monitor unit that compares the first instruction to the second instruction to determine whether the first instruction differs in instruction type from the second instruction to detect an abnormal behavior.

34. The system of claim 33, wherein the first and second processor cores are responsive to the monitor unit.

35. The system of claim 34, wherein the first processor core suspends execution of the first program code when the abnormal behavior is detected.

36. A method for controlling operation of a program code in a computer system, comprising:
 generating a plurality of variants from a program code, wherein each variant of the plurality of variants differs from other variants of the plurality of variants, wherein each variant of the plurality of variants is semantically equivalent to the program code, wherein generating the plurality of variants from the program code comprises using either a source code representation of the program code or an object code representation of the program code;
 executing each variant of the plurality of variants;
 monitoring for a divergence of control flow between the variant executions to detect an abnormal execution; and
 determining the abnormal execution within the execution of the variants by majority voting, wherein the abnormal execution differs in control flow from a majority of the variant executions.

37. The method of claim 36, further comprising:
 suspending the abnormal execution after the abnormal execution is detected; and
 continuing to execute the majority of the variant executions after the abnormal execution is detected.

38. The method of claim 36, wherein a variant of the plurality of variants is the program code.

39. The method of claim 36, wherein executing each variant of the plurality of variants comprises executing a chuck of each variant of the plurality of variants, and further comprising:
 committing an instruction that comes from the majority of the variant executions; and canceling an instruction that comes from the abnormal execution.

40. A computer system for controlling operation of a program code, comprising:
 a code variance generator that generates a plurality of variants from a program code, wherein each variant of the plurality of variants differs from other variants of the plurality of variants, wherein each variant of the plurality of variants is semantically equivalent to the program code;
 a processing module, including one or more processors, that executes each variant of the plurality of variants;
 a monitor unit that monitors for a functional difference between the variant executions to detect an abnormal execution, wherein the processing module is responsive to the monitor unit, wherein the monitor unit monitors for a divergence of control flow between the variant executions to detect an abnormal execution and determines the abnormal execution within the execution of the variants by majority voting, wherein the abnormal execution differs in control flow from a majority of the variant executions.

41. The system of claim 40, wherein the processing module comprises a first processor to execute a first variant and second variant from the plurality of variants.

42. The system of claim 40, wherein the processing module comprises a first processor to execute a first variant from the plurality of variants and a second processor to execute a second variant from the plurality of variants.

43. The system of claim 40, wherein generating the plurality of variants from the program code comprises using a source code representation of the program.

44. The system of claim 40, wherein generating the plurality of variants from the program code comprises using an object code representation of the program.

45. The system of claim 40, wherein the monitor unit monitors for the functional difference when an execution of a variant of the plurality of variants reaches a system call.

46. The system of claim 40, wherein the processing module suspends execution of each variant of the plurality of variants when the functional difference occurs.

47. The system of claim 40, wherein the processing module suspends the abnormal execution after the abnormal execution is detected and continues to executes the majority of the variant executions after the abnormal execution is detected.

48. The system of claim 40, wherein the processing module commits an instruction that comes from the majority of the variant executions and cancels an instruction that comes from the abnormal execution.

49. A computer program product, encoded on a non-transitory computer-readable medium, operable to cause data processing apparatus to perform operations comprising:
- generating a plurality of variants from a program code, wherein each variant of the plurality of variants differs from other variants of the plurality of variants, wherein each variant of the plurality of variants is semantically equivalent to the program code, wherein a variant of the plurality of variants is the program code;
- executing each variant of the plurality of variants;
- monitoring for a divergence of control flow between the variant executions to detect an abnormal execution; and
- determining the abnormal execution within the execution of the variants by majority voting, wherein the abnormal execution differs in control flow from a majority of the variant executions.

50. The computer program product of claim 49, further operable to cause data processing apparatus to perform operations comprising:
- suspending the abnormal execution after the abnormal execution is detected; and
- continuing to execute the majority of the variant executions after the abnormal execution is detected.

51. The computer program product of claim 49, wherein generating the plurality of variants from the program code comprises using either a source code representation of the program code or an object code representation of the program code.

52. The computer program product of claim 49, wherein each variant of the plurality of variants differs from other variants of the plurality of variants by one or more characteristics selected from a group comprising a direction of stack growth, padding between call stack members, register allocation, and heap allocation.

53. The computer program product of claim 49, further operable to cause data processing apparatus to perform operations comprising executing the monitoring for the functional difference at user-level.

54. The computer program product of claim 49, further operable to cause data processing apparatus to perform operations comprising executing the monitoring for the functional difference when execution of a variant of the plurality of variants reaches a system call.

* * * * *